US009982722B2

(12) United States Patent
Fukuba et al.

(10) Patent No.: US 9,982,722 B2
(45) Date of Patent: May 29, 2018

(54) TORQUE TRANSFER IN LATERALLY ENGAGING DRIVE COUPLERS EXHIBITING AXIAL MISALIGNMENT WITH DRIVEN COUPLERS

(71) Applicant: SolarCity Corporation, San Mateo, CA (US)

(72) Inventors: Daniel I. Fukuba, San Francisco, CA (US); Benjamin D. Sumers, Los Altos Hills, CA (US); Jeremy P. Dittmer, Mountain View, CA (US); Merritt J. Jenkins, Redwood City, CA (US); Kevin C. Chu, Mountain View, CA (US); Vayardo L. Ruiz, Santa Clara, CA (US)

(73) Assignee: SolarCity Corporation, San Mateo, CA (US)

( * ) Notice: Subject to any disclaimer, the term of this patent is extended or adjusted under 35 U.S.C. 154(b) by 725 days.

(21) Appl. No.: 13/938,215

(22) Filed: Jul. 9, 2013

(65) Prior Publication Data

US 2015/0014114 A1   Jan. 15, 2015

(51) Int. Cl.
*F16D 11/16*   (2006.01)
*F16D 3/04*   (2006.01)
(Continued)

(52) U.S. Cl.
CPC ............... *F16D 11/16* (2013.01); *B25J 5/02* (2013.01); *F16D 3/04* (2013.01); *F16D 3/10* (2013.01);
(Continued)

(58) Field of Classification Search
CPC ... F16D 11/16; F16D 3/04; F16D 3/10; F16D 1/101; F16D 3/02; B25J 5/00; B25J 5/005;
(Continued)

(56) References Cited

U.S. PATENT DOCUMENTS 1,398,679 A * 11/1921 Clark ..................... B23B 31/08
                                                                    279/16
2,407,160 A *  9/1946 Kahn ..................... F16B 39/34
                                                                    411/301
(Continued)

FOREIGN PATENT DOCUMENTS

CN         202158097 U    3/2012
DE          2334682 A1    3/1974
(Continued)

OTHER PUBLICATIONS

PCT/US2014/045876 International Search Report and Written Opinion of the International Searching Authority (ISA), International Application Division—Korean Intellectual Property Office, dated Nov. 24, 2014.
(Continued)

*Primary Examiner* — Terry C Chau
(74) *Attorney, Agent, or Firm* — Kilpatrick Townsend & Stockton LLP

(57) ABSTRACT

The present invention relates to transferring torque between a first unit, which is typically a mobile machine or a robot, and a second unit, which is typically a fixed or stationary machine. The units are arranged such that a drive coupler of the first unit designed for delivering torque about a drive axis can engage the driven coupler, which belongs to the second unit and has a driven axis, along an engagement direction that is nearly perpendicular to the direction of the driven axis. A lateral displacement mechanism in provided is the first unit to achieve a first-order coaxial alignment between the drive and driven axes. Additional measures such as compliance mechanisms are provided for improving engagement, coupling and reducing the level of axial misalignment in the apparatus and methods of the invention.

20 Claims, 13 Drawing Sheets

(51) Int. Cl.
*B25J 5/02* (2006.01)
*F24J 2/38* (2014.01)
*F16D 3/10* (2006.01)

(52) U.S. Cl.
CPC ................. *F24J 2/38* (2013.01); *Y02E 10/47* (2013.01); *Y10S 901/01* (2013.01); *Y10S 901/30* (2013.01); *Y10T 74/19614* (2015.01)

(58) Field of Classification Search
CPC ..... B25J 5/02; F24J 2002/385; F24J 2200/04; F24J 2/38; F24J 2/523; F24J 2/5264; Y02E 10/47; Y10S 901/01; Y10S 901/41; Y10S 901/30; Y10T 74/19614
See application file for complete search history.

(56) References Cited

U.S. PATENT DOCUMENTS

| | | | |
|---|---|---|---|
| 2,574,026 A * | 11/1951 | Eslick | B25B 23/106 |
| | | | 81/448 |
| 3,747,966 A | 7/1973 | Wilkes et al. | |
| 4,130,152 A * | 12/1978 | Bolen | B25B 15/007 |
| | | | 81/451 |
| 4,289,414 A | 9/1981 | Recker | |
| 4,336,870 A | 6/1982 | Shea | |
| 4,342,535 A | 8/1982 | Bartlett et al. | |
| 4,635,772 A | 1/1987 | Gadelius | |
| 5,432,582 A | 7/1995 | Horning et al. | |
| 6,318,657 B1 | 11/2001 | Nayak | |
| 6,464,589 B1 | 10/2002 | Shinozuka | |
| 6,973,856 B2 * | 12/2005 | Shibata | B25J 15/0019 |
| | | | 81/57.4 |
| 7,036,644 B2 | 5/2006 | Stevenson et al. | |
| 8,950,336 B2 * | 2/2015 | Camp | B61B 13/04 |
| | | | 104/119 |
| 9,222,523 B2 * | 12/2015 | Fukuba | F16D 11/14 |
| 9,494,341 B2 * | 11/2016 | Trujillo | F24J 2/40 |
| 2009/0093317 A1 | 4/2009 | Kajiwara et al. | |
| 2010/0158656 A1 * | 6/2010 | Seavey | B25J 5/005 |
| | | | 414/744.5 |
| 2012/0152877 A1 | 6/2012 | Tadayon | |

FOREIGN PATENT DOCUMENTS

| | | |
|---|---|---|
| EP | 2 565 480 A1 | 3/2013 |
| JP | H04-128128 U | 11/1992 |
| JP | H06-026528 A | 2/1994 |
| JP | 2000-042951 A | 2/2000 |
| JP | 2000170783 A | 6/2000 |
| JP | 2005177910 A | 7/2005 |
| JP | 2009-092121 A | 4/2009 |
| WO | WO1998045622 A1 | 10/1998 |
| WO | WO2006082191 A1 | 8/2006 |

OTHER PUBLICATIONS

Office Action, dated Apr. 3, 2017, for Japanese Application No. JP2016-525446, and English Translation, 4 pages.
Extended European Search Report and Search Opinion, dated Apr. 4, 2017, for European Application No. 14822976.8, 9 pages.
Gunther, Edgar A., "QBotix: Rise of the Solbots", Sep. 11, 2012, Menlo Park, California. Retrieved from the Internet at: http://guntherportfolio.com/2012/09/qbotix-rise-of-the-solbots/ on May 16, 2017, 18 pages.

* cited by examiner

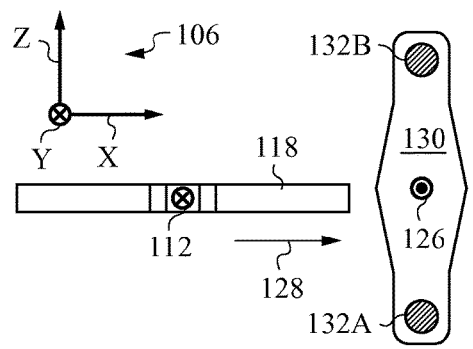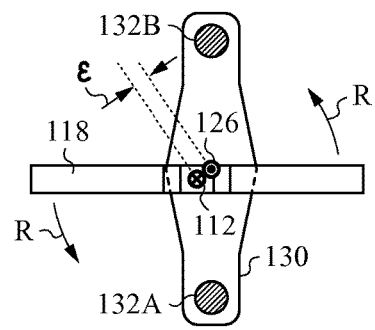
*Fig. 2A*          *Fig. 2B*
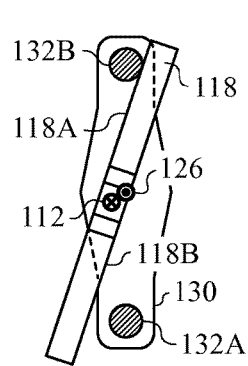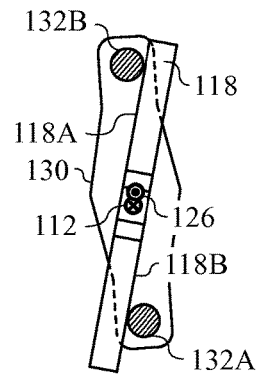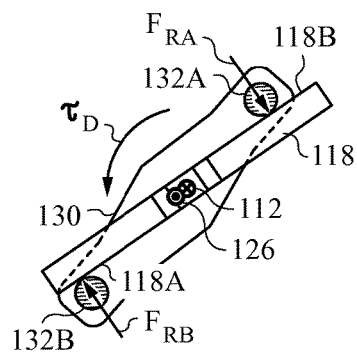
*Fig. 2C*          *Fig. 2D*          *Fig. 2E*
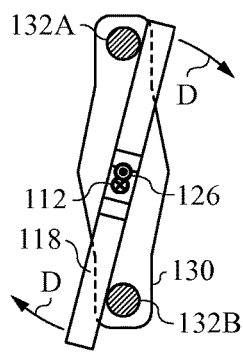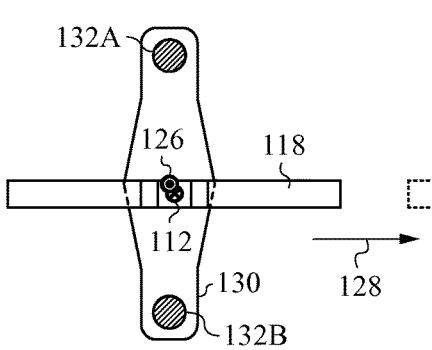
*Fig. 2F*          *Fig. 2G*

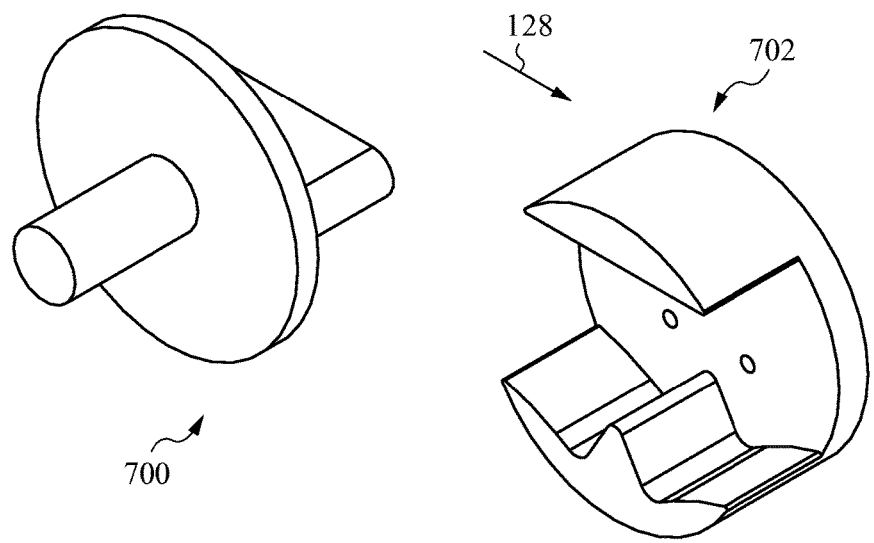
Fig. 12
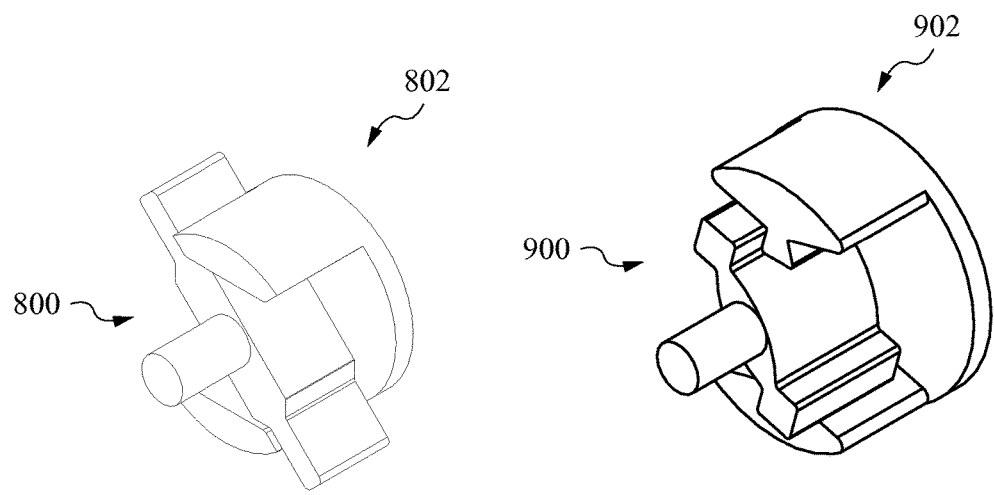
Fig. 13                    Fig. 14

TORQUE TRANSFER IN LATERALLY ENGAGING DRIVE COUPLERS EXHIBITING AXIAL MISALIGNMENT WITH DRIVEN COUPLERS

FIELD OF THE INVENTION

This application is related to apparatus and methods of torque transfer between machines whose drive and driven couplers engage laterally or along a direction that is substantially orthogonal or perpendicular to the driven axis of the driven coupler, and more precisely to torque transfer in the presence of a certain amount of axial misalignment between the drive and driven axes of the drive and driven couplers, respectively.

BACKGROUND ART

There are numerous mechanisms, including well-known clutch systems that are specifically designed for transmitting torque between machines. Many of these mechanisms and clutch systems have parts that engage, disengage and transmit torque. For various reasons, including the need for reliable transmission of torque at different angular velocities, the prior mechanisms attempt to fix and preserve axial alignment between the machines. Typically, machines achieve this by providing for mechanical engagement between the machines along the axis about which the torque is to be transmitted. In most conventions, this is the Y-axis of the Cartesian coordinate system used in the art of mechanical engineering to parameterize clutch systems and the like.

In these prior art systems, operation commences by actuating one of the two couplers, either the drive or the driven coupler, along the Y-axis. Such axial motion along the Y-axis usually engages gear teeth or other coupling features arranged in the X-Z plane and belonging to the drive and driven couplers. Such solutions are often found in power takeoffs on cars, in which an operator inserts the first coupling into the other coupling along a common axis (axially).

One example of the prior art approach is found in U.S. Pat. No. 3,747,966 to Wilkes, who teaches an agricultural tractor with an externally splined power takeoff shaft, which extends longitudinally from the rear portion. A power transmission shaft having a hollow, internally splined portion at its forward end can be connected to the externally splined power takeoff shaft. Engagement and coupling between these shafts is achieved through actuation along the axis about which torque is transmitted.

Another example of a prior art approach to a torque-transmitting mechanism with a latching apparatus is found in U.S. Pat. No. 7,036,644 to Stevenson. Here the mechanism for engaging a torque supply is embodied by a motor with a torque output, such as a wheel. The teachings identify many mechanisms for linear actuation of the torque-transmitting mechanism along the axis about which torque is to be transmitted.

Still another example is provided by the teachings of Nayak in U.S. Pat. No. 6,318,657, which discloses a mechanism for transmitting torque from a coupling to a tape reel while permitting easy engagement. Here, a tape cartridge is provided with reliable reel lock and motor/reel coupling mechanisms whose functions are both accomplished during a single motion of the cartridge relative to the drive motor. Once again, this is a good example of actuation along the axis around which torque is transmitted.

In fact, the prior art is replete with teachings addressing axial actuation in torque transmission apparatus. For select references teaching standard as well as several non-standard coupling designs in such apparatus, the reader is referred to U.S. Pat. No. 4,289,414 to Recker, DE 197 14 605 A1 to Volle, U.S. Pat. No. 4,336,870 to Shea, U.S. Pat. No. 4,635,772 to Gadelius and WO 2006/082191 to Tegtmeyer.

In applications where torque transmission needs to be performed between a mobile unit moving laterally with respect to a stationary unit, or many such stationary units, the typical prior art approach is oftentimes not practicable. Specifically, when the mobile unit is a robot that moves laterally from station to station to transfer torque to machinery mounted at each station, traditional methods of torque transfer are not well suited. Under these conditions repeatable and reliable axial actuation is difficult to perform.

An exemplary teaching showing how to adapt traditional torque transfer apparatus and methods under these circumstances is found in U.S. Published Application 2012/01522877 Tadayon. Among many aspects, this reference teaches a robot for solar farms where such torque transmission to a stationary unit, e.g., a stationary unit bearing a solar tracker, is required. In one case torque transfer is accomplished by a rack and pinion mechanism. In another case the transmission of torque from the robot to the tracker is performed with the aid of a mechanism called a "tilt arm" that produces motion along the axis about which torque is to be transmitted.

In view of the above teachings new solutions to torque transfer between mobile units, e.g., robots, traveling laterally with respect to stationary units, e.g., docking stations, are needed.

OBJECTS OF THE INVENTION

In view of the prior art limitations, it is an object of the invention to provide for torque transfer between mobile and stationary units that engage laterally or along an engagement direction that is substantially orthogonal to the axis about which the torque is transmitted. In other words, it is an objective of the invention to provide for apparatus and methods to transfer torque from one machine to another without the need to control translation along the axis around which torque is being transmitted.

It is another object of the invention to provide for torque transfer upon lateral engagement between drive and driven couplers belonging to such mobile and stationary units under conditions of axial misalignment between the drive and driven axes. More precisely, it is an objective to provide for transferring torque that can accommodate misalignment of the couplers. The design of the coupler can be such that when torque is transmitted and the couplers are misaligned, components of the contact forces push the couplers back into stable alignment.

Still other objects and advantages of the invention will become apparent upon reading the detailed description in conjunction with the drawing figures.

SUMMARY OF THE INVENTION

Several advantageous aspects of the invention are secured by an apparatus for transferring torque between a first unit, which is typically a mobile machine or a robot, and a second unit, which is typically a fixed or stationary machine. The apparatus has a drive coupler mounted on the first unit and designed for delivering the torque through rotation about a drive axis. Meanwhile, a driven coupler with a driven axis is mounted on the second unit and arranged such that it can engage with the drive coupler along an engagement direction that is substantially orthogonal or perpendicular to the direction defined by the driven axis. A lateral displacement mechanism is provided for moving the drive coupler, either independently or along with the entire first unit. In any case, the drive coupler is moved along the engagement direction to achieve a first-order coaxial alignment between the drive axis and the driven axis of the driven coupler. The apparatus also has a torque delivery drive, which can be embodied by a motor, for rotating the drive coupler about the drive axis after the first-order coaxial alignment is achieved so as to couple to the driven coupler and transfer the torque about the driven axis. In this manner, the apparatus is configured to engage and transfer torque between the units whenever required, but typically not on a permanent basis.

The drive coupler has a first mating member and the driven coupler has a corresponding second mating member. These members are designed or shaped to exhibit a matched geometry. Specifically, their matched geometry is such that it defines a pass-through orientation in which the first member passes through the second member without making physical contact. The matched geometry further defines a relative coupling orientation in which the first member couples to the second member.

In preferred embodiments of the apparatus, a compliance mechanism is provided to adapt to the first-order coaxial alignment, i.e., the level of misalignment or the lack of high-precision axial alignment between the drive and driven axes while transferring torque. The compliance mechanism itself can take on many physical embodiments and it can be mounted in various locations. For example, the compliance mechanism can be mounted in the first unit and it can be represented by a drive-side mechanism for adapting to the axial misalignment. More precisely, it can be embodied by one or more flexible mounting elements attaching the torque delivery drive, e.g., the motor, to the first unit in a manner that supports motion of the motor and preferably translational motion. Suitable mounting elements are springs, dampers, pistons, flexible grommets, linear slides and the like. Alternatively or in addition, the drive-side mechanism for adapting to the imperfect first-order coaxial alignment can be incorporated in a drive shaft that is oriented along and turns about the drive axis to deliver the torque. Specifically, the drive shaft can incorporate one or more flexible elements such as flexible shafts or shaft portions, compliant linkages, helical couplings, universal joints, gimbals, magnetic couplings and the like.

In combination or separately from the one or more compliance mechanisms operating on the first unit, one or more compliance mechanisms can be mounted within the second unit. Once again, these can include drive-side mechanisms for adapting to the imperfect first-order coaxial alignment embodied by a driven shaft oriented along the driven axis and incorporating one or more flexible shaft elements such as flexible shafts or shaft portions, compliant linkages, helical couplings, universal joints, gimbals, magnetic couplings and the like.

The first and second mating members used by the drive and driven couplers to couple for the torque transmission process are preferably provided with certain structure. For example, they have engagement features designed for urging the members to assume a three-dimensionally constrained relative engagement pose. Preferably, the engagement features not only support coupling with the amount of misalignment due to imperfect first-order coaxial alignment, but even reduce misalignment to a second-order coaxial alignment. The engagement features can be embodied by engagement prongs, pins, protrusions and other geometric features on either member. Preferably, complementary mating features, which can be embodied by recesses, slots or ridges, are provided on the other member to urge the members into the three-dimensionally constrained relative engagement pose that also reduces axial misalignment. The improvement in misalignment to a second-order coaxial alignment is especially important when the first-order coaxial alignment is so poor that it exceeds a predetermined tolerance.

In some embodiments it is advantageous to provide the drive coupler with one or more collision-mitigating features to mitigate the impact of collisions with the driven coupler that can occur during regular operation. For example, when the apparatus further comprises a rail on which the first unit is mounted and along which it moves between a number of second units, collisions are likely to occur. The second units can be embodied by docking stations or they can be machines fixed at such docking stations to support equipment that requires delivery of torque from the mobile first unit to perform certain operations. The mating members on the driven shafts of the second units can become oriented or re-oriented in unpredictable ways during operation. As a result, the mating member on the drive shaft of the mobile first unit can experience many collisions in moving from one docking station to another.

The methods of invention are designed for transferring torque between first and second units. A preferred method calls for mounting the drive coupler with the drive axis on the first unit and mounting the driven coupler with the driven axis on the second unit. The drive coupler is then moved, typically along with its entire unit, along an engagement direction that is substantially orthogonal to the orientation of the driven axis in order to engage with the driven coupler. In this process a first-order coaxial alignment with a certain amount of axial misalignment that is tolerable is achieved between the drive and driven axes. The drive coupler is rotated about the drive axis after the tolerable first-order coaxial alignment is achieved to couple to the driven coupler and to transfer the required torque from the first to the second unit. The preferred method deploys first and second mating members on the drive and driven couplers that are designed in a matched geometry. Such design ensures a pass-through orientation and a relative coupling orientation in which the mating members couple.

In an advantageous method of the invention the driven coupler is positioned at an idle orientation relative to the drive coupler prior to engagement. Of course, since the driven coupler has no ability to rotate on its own, it is preferable that the drive coupler rotate the driven coupler into the idle orientation after torque transfer but prior to disengagement from the driven coupler. The idle orientation should ensure that the driven coupler remains outside a range of angular positions or keep-out zone, quantified by a keep-out-angle, which represents driven coupler orientations that will result in undesirable collisions with the drive coupler as it approaches the driven coupler to engage along the direction of engagement.

The method further provides for adapting to the axial misalignment between the drive and driven axes by any suitable means and for providing the couplers with mating members endowed with one or more engagement features. Preferably, the engagement features are complementary and when torque is applied they force the drive and driven couplers to assume the desirable, three-dimensionally constrained relative engagement pose. This becomes especially important when the first-order coaxial alignment is poor and exceeds a certain tolerance level.

The details of the invention, including its preferred embodiments, are presented in the below detailed description with reference to the appended drawing figures.

BRIEF DESCRIPTION OF THE DRAWING FIGURES

FIGS. 2A-G are plan views illustrating engagement, rotation and coupling between the mating members of drive and driven couplers.

Figure 3:
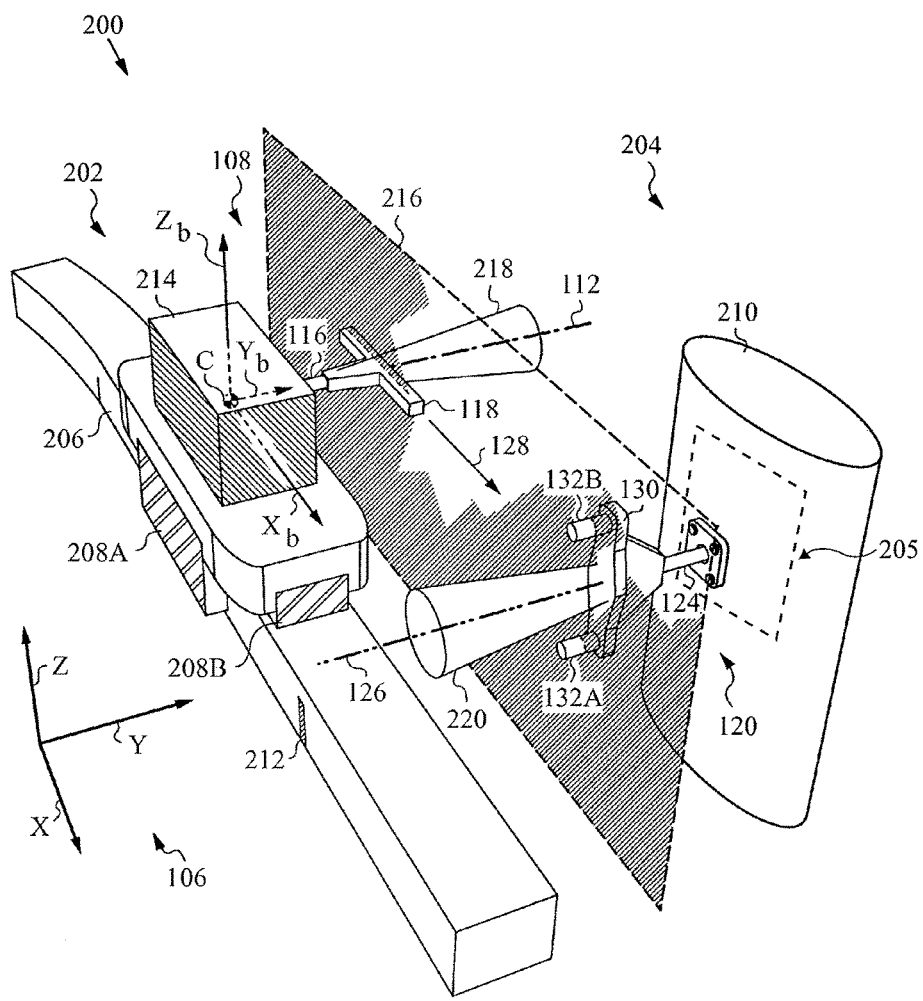

FIG. 3 is a perspective view of an apparatus in which the first unit is displaced along a rail in accordance with the invention.

Figure 4:
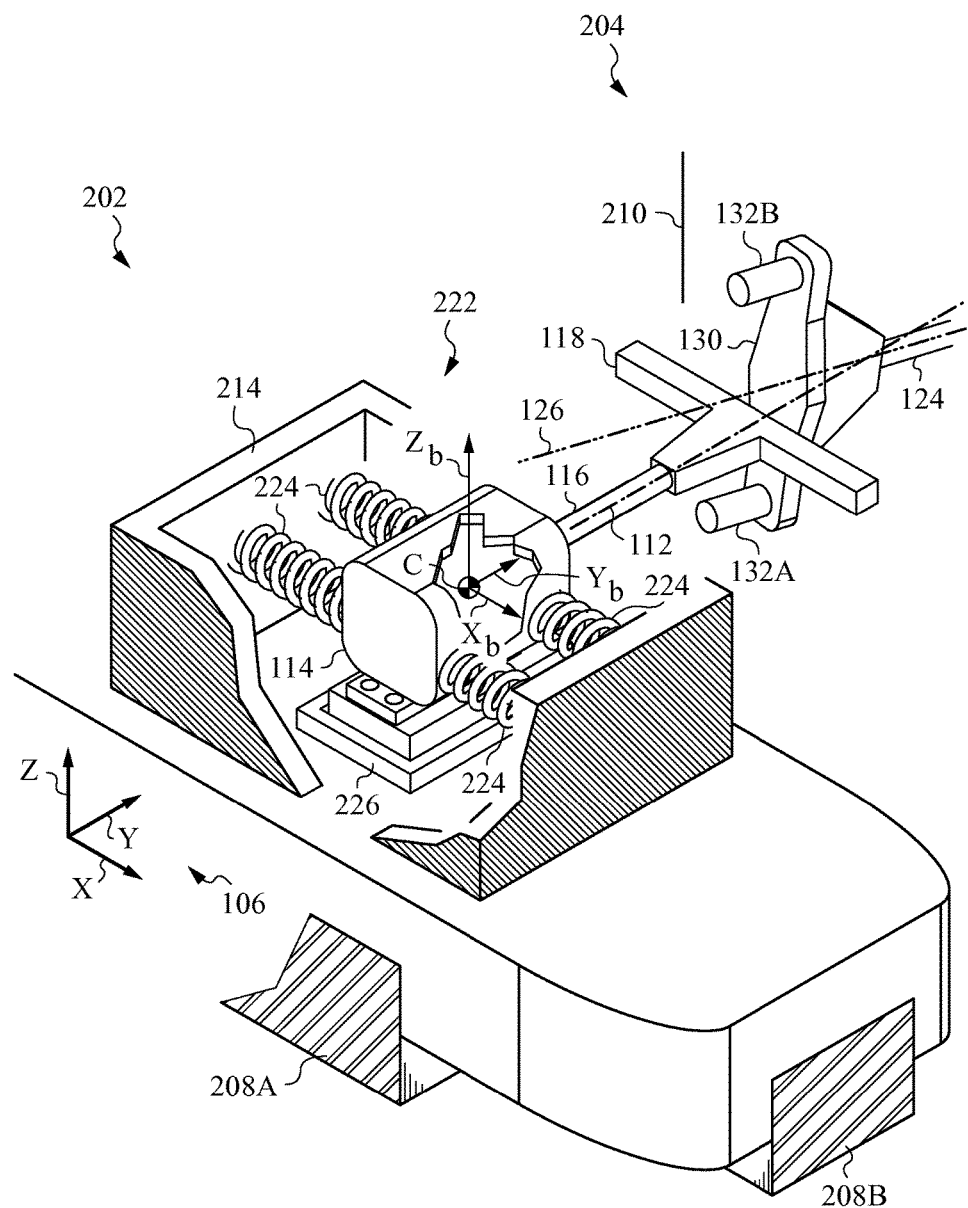

FIG. 4 is a partial isometric view of the apparatus of FIG. 3 when drive and driven couplers are in the engaged position.

Figure 5:
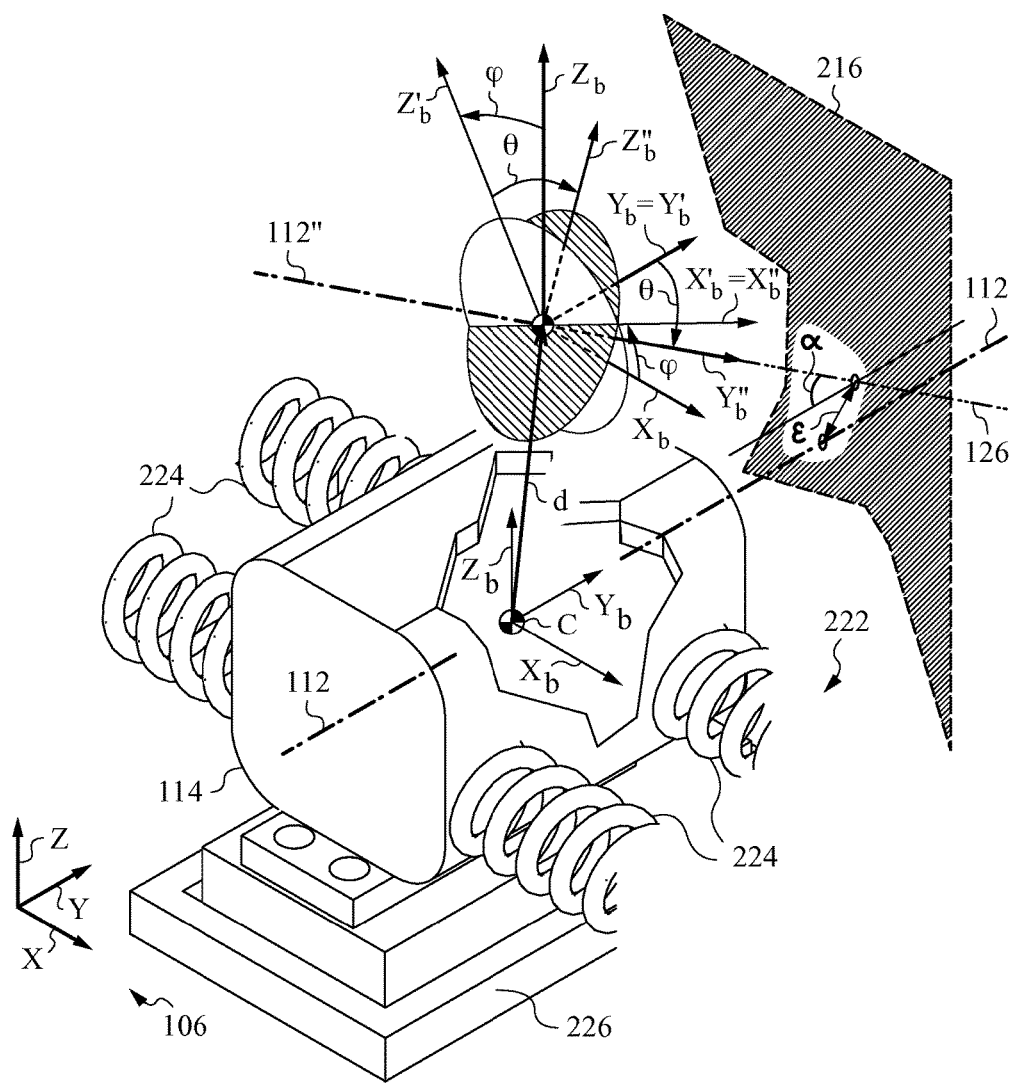

FIG. 5 is a partial isometric view of the motor in the apparatus of FIG. 3 and its compliance mechanisms for adapting to first-order coaxial alignment between the drive and driven axes during torque transfer.

Figure 6:
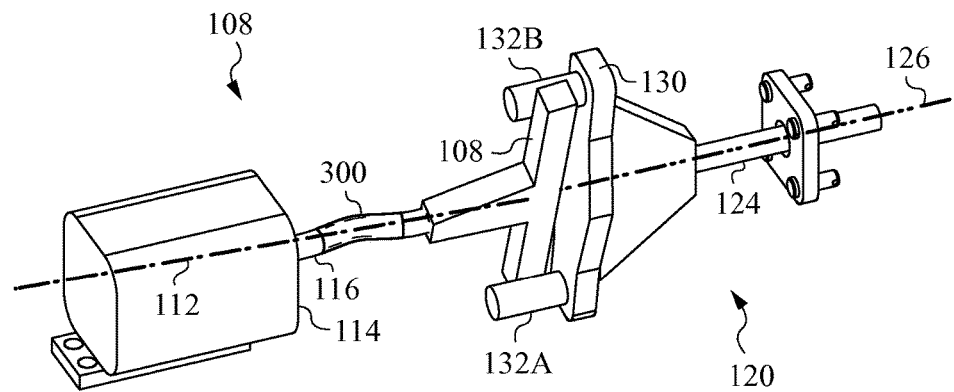

FIG. 6 is a partial isometric view of an embodiment in which the drive-side compliance mechanism includes a flexible shaft.

Figure 7A:
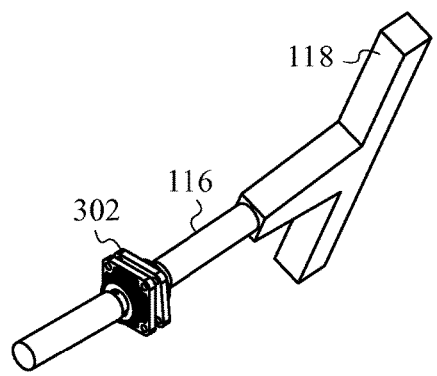
Figure 7B:
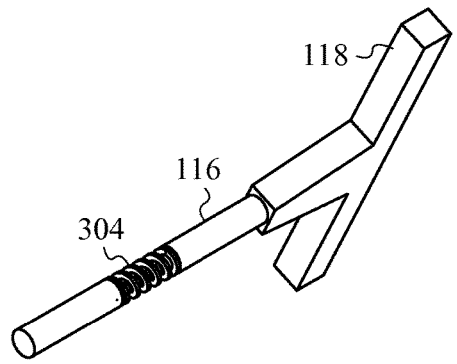
Figure 7C:
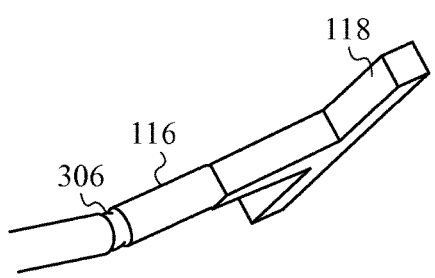

FIG. 7A-C are partial isometric views of alternative driver-side compliance mechanisms deployed on the drive shaft.

Figure 7D:
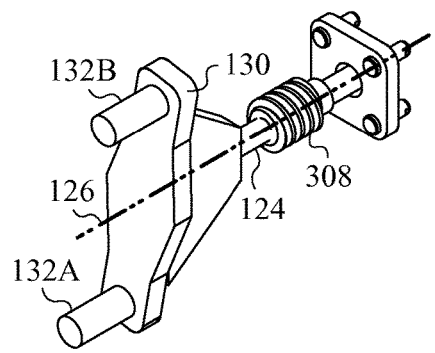

FIG. 7D is a partial isometric view of a driven-side compliance mechanism deployed on the driven shaft.

Figure 8A:
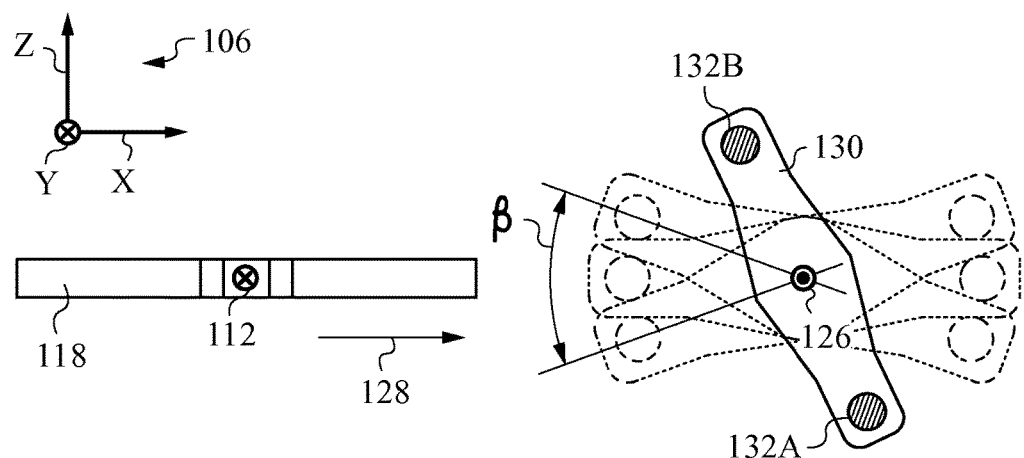
Figure 8B:
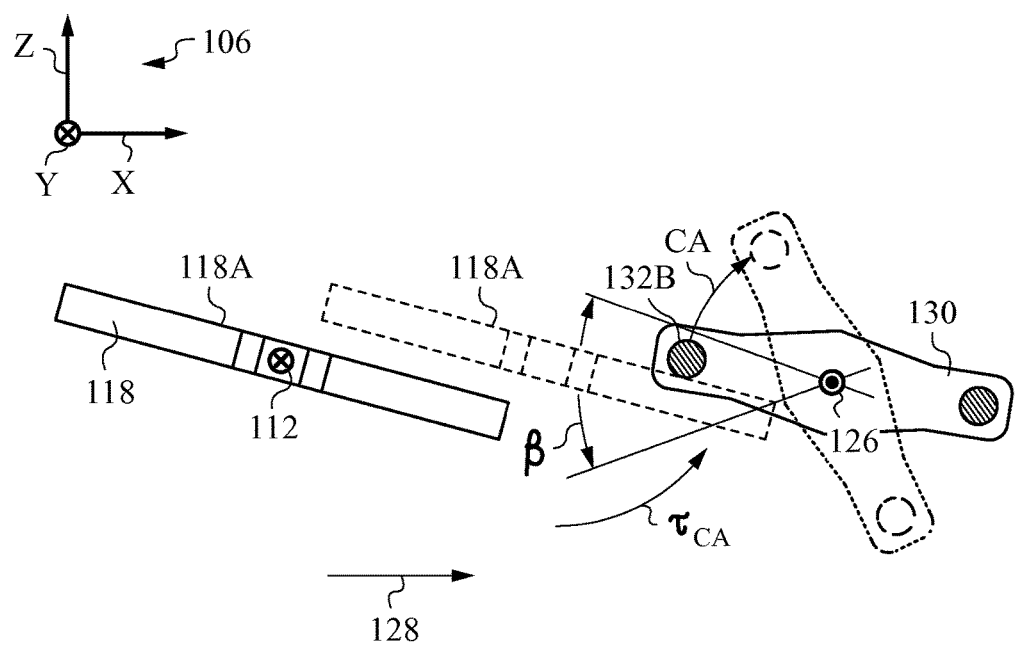

FIGS. 8A-B are plan views illustrating two methods of collision avoidance.

FIGS. 9A-E is a series of isometric views of an advantageous design and method of engagement between mating members using engagement features and achieving a three-dimensionally constrained relative engagement pose and second-order coaxial alignment correction.

Figure 10A:
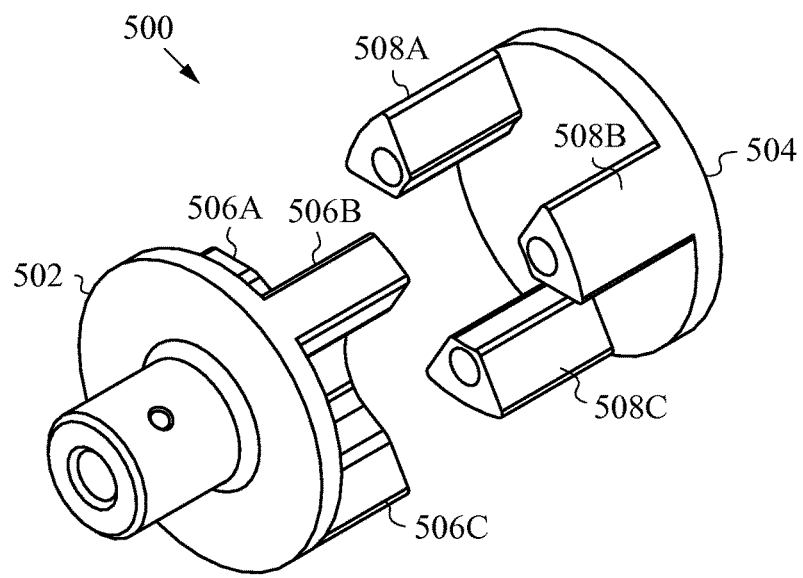

FIG. 10A is an isometric view showing a positive or dog clutch from which complementary engagement features are derived.

Figure 10B:
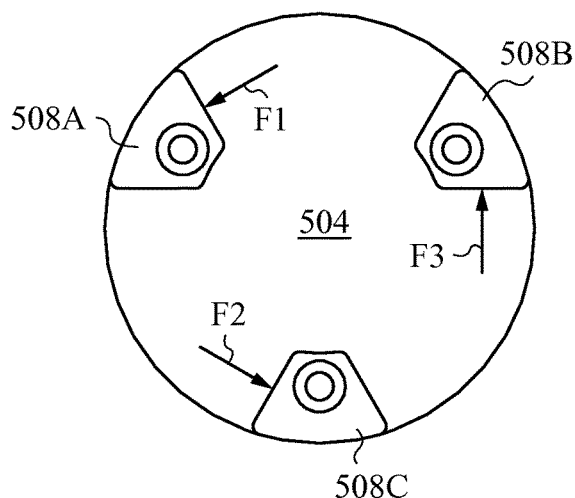

FIG. 10B is a plan view of the dog gear of FIG. 10A.

Figure 11A:
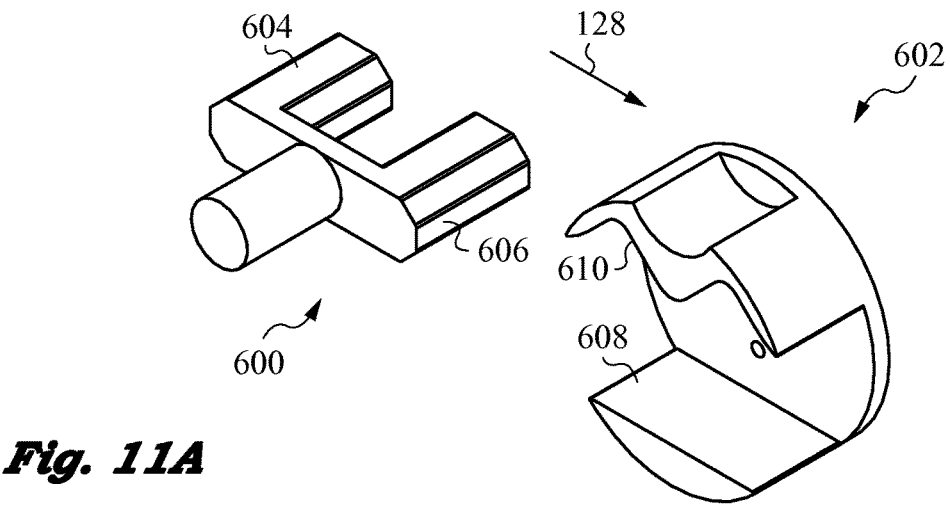

FIG. 11A is an isometric view of mating members with advantageous complementary engagement features.

Figure 11B:
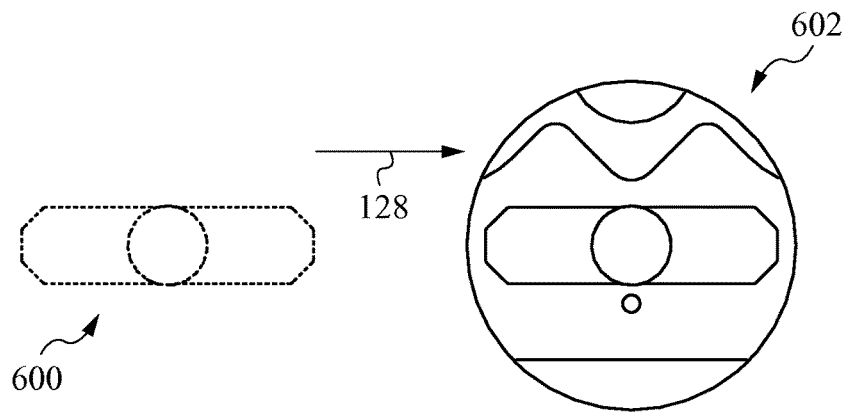
Figure 11C:
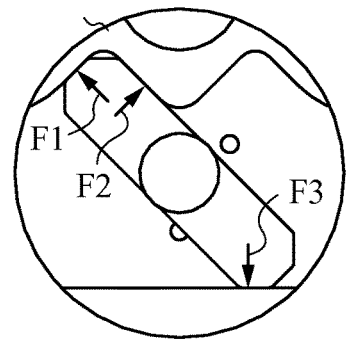

FIGS. 11B-C are plan views of the mating members of FIG. 11A.

FIG. 12 is an isometric view of another set of members deploying complementary engagement features according to the invention.

FIG. 13 is an isometric view of another set of members using complementary engagement features according to the invention.

FIG. 14 is an isometric view of yet another set of members using complementary engagement features according to the invention.

DETAILED DESCRIPTION

The figures and the following descriptions relate to preferred embodiments of the present invention by way of illustration only. It should be noted that alternative embodiments of the structures and methods disclosed herein will be readily recognized as viable options that can be employed without departing from the principles of the claimed invention.

Reference will now be made to several embodiments of the present invention, examples of which are illustrated in the accompanying figures. Similar or like reference numbers are used to indicate similar or like functionality wherever practicable. The figures depict embodiments of the present invention for purposes of illustration only.

Figure 1A:
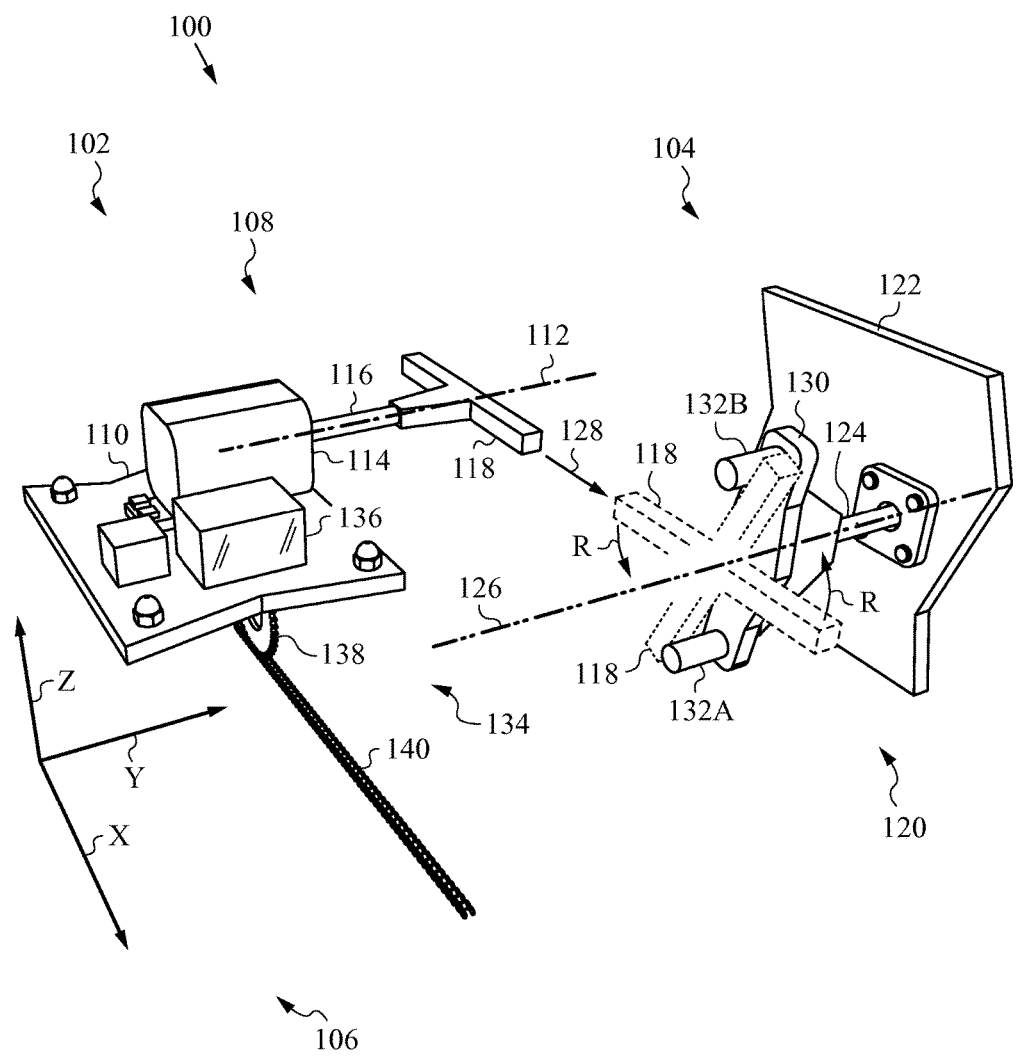
FIG. 1A is a partial perspective view of a portion of a first unit and a portion of a second unit equipped with drive and driven couplers according to the invention.

The present invention will be best understood by first reviewing an apparatus 100 for transferring torque between a first unit 102 and a second unit 104 as shown in the partial perspective view of FIG. 1A. First unit 102 is a mobile machine only partially shown in the drawing figure. Second unit 104 is also a machine only partially shown, but unlike machine 102, machine 104 is fixed or stationary.

To better describe the invention and especially the relationship between units 102, 104 a coordinate system 106 is used to parameterize the environment. Although, as any person skilled in the art will realize, any suitable coordinates can be used, we adopt herein a right-handed Cartesian system with coordinate axes (X,Y,Z) oriented as shown in which the X-Y plane is substantially horizontal and the Z-axis is substantially vertical. In this convention, movement or displacement of mobile machine 102 is along the X-axis in either the positive or negative direction.

Mobile machine 102 has a drive coupler 108 mounted to its chassis 110. Drive coupler 108 has a drive axis 112 designated with a dashed-and-dotted line. Furthermore, drive coupler 108 also has a torque delivery drive 114, in the present case embodied by a motor that has a drive shaft 116 oriented along drive axis 112. Motor 114 is designed to generate a delivered torque $\tau_D$ by rotating drive shaft 116 about drive axis 112.

To assist in the delivery of torque $\tau_D$, drive coupler 108 has a first mating member 118 at the distal end of drive shaft 116. Mating member 118 can be designed in many ways and it can conform to various geometries. In the present embodiment, mating member 118 is a simple T-bar.

Meanwhile, a driven coupler 120, i.e., the coupler that is to be driven by drive coupler 108, is mounted on a chassis 122 belonging to stationary machine 104. Driven coupler 120 has a driven shaft 124 that extends along a driven axis 126 indicated with a dashed-and-double-dotted line. Coupler 120 is arranged such that it can engage with drive coupler 108 as the latter moves along an engagement direction 128 indicated by the corresponding arrow. In coordinate system 106 defined herein, engagement direction 128 is along the X-axis.

It is noted that engagement direction 128 is close to and preferably orthogonal or perpendicular to the direction defined by driven axis 126. Thus, according to the invention, drive and driven couplers 108, 120 are designed to engage laterally along engagement direction 128 rather than axially (along axis 112 or axis 126 as is typical for various types of clutch and torque transfer mechanisms).

To assist in engagement, proper rotation and coupling with mating member 118 of drive coupler 108, driven shaft 124 has a second mating member 130 at its distal end. Here, second mating member 130 is chosen to be a yoke with two engagement features in the form of pins or prongs 132A, 132B. Initially, yoke 130 is oriented such that prongs 132A, 132B are aligned almost vertically. This alignment of prongs 132A, 132B is also along the Z-axis of coordinate system 106, which is almost perpendicular to the engagement direction 128 (i.e., the horizontal X-axis of coordinate system 106).

Mobile machine 102 has a lateral displacement mechanism 134 for propelling or moving it along engagement direction 128. It is important to note that lateral displacement mechanism 134 can be embodied by any suitable mechanical arrangement capable of ensuring that drive coupler 108 is reliably displaced or moved along engagement direction 128 or parallel to the X-axis in coordinate system 106 as defined herein. In this case, and indeed in many practical embodiments, entire mobile machine 102 is moved for this purpose. Of course, this is not always required, as will be appreciated by a skilled artisan.

In the present embodiment, an exemplary lateral displacement mechanism 134 includes a control unit 136 and a sprocket wheel or pinion 138 that is constrained to move along a fixed rail 140. In fact, a person skilled in the art will recognize the arrangement to be similar to a rack-and-pinion mechanism. Rail 140 is composed of a series of mechanical links and extends parallel to the X-axis. By turning pinion 138, control unit 136 effectuates the requisite displacement to move drive coupler 108 along engagement direction 128 to driven coupler 120 mounted on stationary machine 104.

Control unit 136 is designed to turn pinion 138 until first mating member 118 embodied by the T-bar is aligned with second mating member 130 embodied by the yoke. More precisely still, T-bar 118 is moved until drive axis 112 along which it extends achieves a first-order coaxial alignment with driven axis 126 along which yoke 130 extends. First-order coaxial alignment between drive and driven axes 112, 126 should keep axial misalignment below a certain tolerance and thus enable reliable transmission of torque. More specific metrics of tolerance and acceptable amount of axial misalignment between axes 112, 126 will be discussed in more detail below.

The location of T-bar 118 at the time when first-order coaxial alignment is established and the horizontal orientation (i.e., substantially along the X-axis) of T-bar 118 at this moment are shown in long-dashed lines. Note that first-order coaxial alignment can be ascertained by any suitable sensor (not shown) or features, or by knowing the position of pinion 138 along rack 140. The operation of requisite position sensors and associated techniques are well known to those skilled in the art.

In the present embodiment, a permanent magnet is fixed on stationary machine 104 and a linear position sensor is mounted on mobile machine 102. The changing magnetic flux registered by the linear position sensor is used to align drive and driven axes 112, 126 to first-order coaxial alignment. Alternatively, an encoder in control unit 136 on the drive motor that turns pinion 138 can be deployed to aid in alignment. The encoder counts the number of revolutions of pinion 138. Based on the encoder's count, control unit 136 knows the approximate location of mobile machine 102 along rail 140. Now, since the location of stationary machine 104 along rail 140 is known as well, the encoder can thus be used for first-order coaxial alignment of axes 112, 126. Although either alignment strategy can be implemented on its own, a more robust approach combines both of them.

After first-order coaxial alignment between axes 112, 126 is achieved, T-bar 118 is rotated by motor 114, as indicated by arrows R. Specifically, T-bar 118 is rotated about drive axis 112 until it reaches a relative coupled orientation with respect to yoke 130 as shown in short-dashed lines.

Figure 1B:
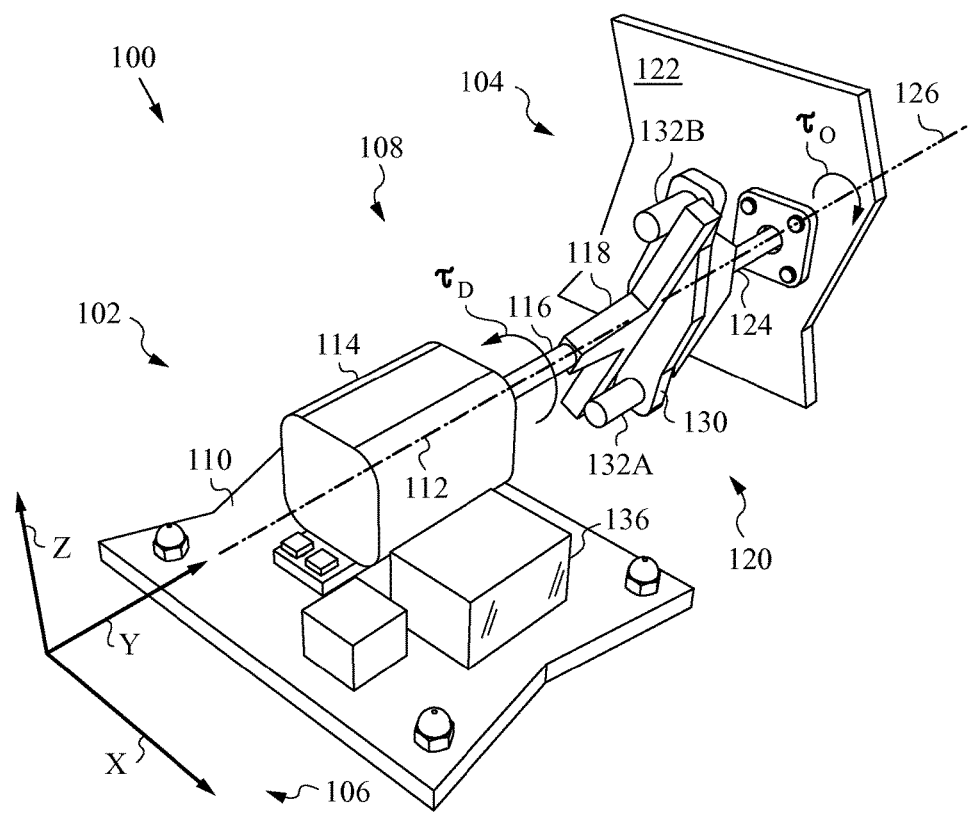
FIG. 1B is a partial perspective view of the first and second units of FIG. 1A as their drive and driven couplers are being coupled to transfer torque between the units.

To understand the transfer of torque between machines 102, 104 of apparatus 100 once T-bar 118 is coupled to yoke 130 in the coupled orientation, we refer to the partial perspective view of apparatus 100 afforded by FIG. 1B. Here drive and driven axes 112, 126 are shown already aligned within the tolerance prescribed by first-order coaxial alignment. For simplicity, axes 112, 126 in this state are almost collinear with the Y-axis of coordinate system 106. The tolerance and the amount of axial misalignment are too small to show in FIG. 1B, and will be addressed in more detail below.

When a coupled state between T-bar 118 and yoke 130 is thus achieved, the transfer of delivered torque $\tau_D$ produced by motor 114 to prongs 132A, 132B of yoke 130 can commence. Of course, in the process of torque transfer yoke 130 will react with an opposing torque $\tau_O$ acting on T-bar 118. It is noted that apparatus 100 is configured to engage and transfer torque $\tau_D$ between machines 102, 104 whenever required, but typically not on a permanent basis. In other words, after transferring torque $\tau_D$ for a certain amount of time, T-bar 118 and yoke 130 are disengaged and machine 102 is further displaced along direction 128.

We now turn to FIGS. 2A-G to study the engagement, rotation and coupling of T-bar 118 with yoke 130 under the condition of first-order coaxial alignment between drive and driven axes 112, 126. FIG. 2A is a plan view illustrating T-bar 118 approaching yoke 130 laterally along engagement direction 128. As already remarked above, given the presently adopted coordinate system 106, direction 128 is parallel with the X-axis. Meanwhile, the Y-axis of coordinate system 106 is pointing into the page in FIG. 2A, as indicated. For better visualization, drive axis 112, about which T-bar 118 is configured to rotate, also points into the page. In contrast, driven axis 126, about which yoke 130 is configured to rotate, points out of the page. Of course, a person skilled in the art will realize that other definitions can be adopted depending on specific set-ups and sign conventions.

It is preferable that before engagement, yoke 130 be oriented such that prongs 132A, 132B are aligned with one another along the Z-axis, as shown in FIG. 2A. If yoke 130 were oriented with its prongs 132A, 132B generally aligned with one another along the X-axis, then T-bar 118 approaching laterally along engagement direction 128 would collide with yoke 130. Such collisions are undesirable and further provisions for avoiding them or mitigating their consequences are addressed below. In the meantime, the preferred orientation with prongs 132A, 132B along the Z-axis to limit potential collisions between T-bar 118 and yoke 130 will be referred to herein as an idle or a pass-through orientation. One should keep in mind, however, that the idle or pass-through orientation relates to a relative orientation between T-bar 118, yoke 130 and engagement direction 128 rather than an absolute orientation in coordinate system 106.

Furthermore, according to the invention, first and second members belonging to the drive and driven couplers respectively, here embodied by T-bar and yoke 118, 130, should always exhibit a matched geometry. Matched geometry as understood herein provides for the existence of at least one pass-through orientation between the first and second members. Matched geometry thus means that first and second members 118, 130 along with all their engagement features, in this case just the surfaces of T-bar 118 itself and prongs 132A, 132B, are designed or shaped to define this pass-through orientation and its exact parameters. In the pass-through orientation of FIG. 2A, T-bar 118 moving along direction 128 can pass through yoke 130, and more specifically between prongs 132A, 132B of yoke 130, without making any physical contact with yoke 130.

FIG. 2B shows T-bar 118 still generally oriented along the X-axis but now moved along engagement direction 128 into position between prongs 132A, 132B of yoke 130. Here the axial misalignment between drive and driven axes 112, 126 is clearly visible. In particular, drive axis 112 of T-bar 118 is offset with respect to driven axis 126 of yoke 130. This offset produces axial misalignment ϵ below and to the left of driven axis 126 of yoke 130. The magnitude of axial misalignment ϵ is below a tolerance δ (not shown) prescribed for first-order coaxial alignment between axes 112, 126.

With axes 112, 126 aligned to within tolerance δ prescribed by first-order coaxial alignment, drive and driven couplers 108, 120 (see FIG. 1B) are considered engaged. Now, motor 114 of drive coupler 108 (see FIG. 1B) rotates T-bar 118 as indicated by arrows R. In the present embodiment and from the vantage point depicted in FIG. 2B, the rotation is counter-clockwise and it results in T-bar 118 rotating about drive axis 112.

FIG. 2C shows T-bar 118 rotated into an orientation in which its top surface 118A has established contact with prong 132B of yoke 130. At this point, further rotation of T-bar 118 about drive axis 112 will force bottom surface 118B to establish contact with prong 132A. FIG. 2D shows T-bar 118 rotated by motor 114 (see FIG. 1B) into an orientation in which its bottom surface 118B has established contact with prong 132A. Note that because of the already established contact between top surface 118A and prong 132B yoke 130 may rotate slightly in the counter-clockwise direction during this process.

It should be remarked, that since this embodiment does not deploy a compliance mechanism, the effects of sliding of T-bar 118 against the prongs of yoke 130 have to be taken into consideration. The sliding of T-bar 118 against prongs 132A, 132B during the part of the process shown in FIGS. 2C-D will increase wear and the uneven force on yoke 130 will result in high bending stress and could potentially even cause prongs 132A, 132B to slip off of T-bar 118. In conditions where these adverse effects are unacceptable (especially in cases of decoupling or disengagement due to slip off), a compliance mechanism and appropriate engagement features should be used to force T-bar 118 to center itself as much as possible to yoke 130. Suitable compliance mechanisms and engagement features are addressed further below.

The relative orientation of T-bar 118 and yoke 130 shown in FIG. 2D is a relative coupling orientation. It is the matched geometry that defines the relative coupling orientation in which the first member couples to the second member. In the coupled state torque can be transferred.

In the present embodiment, coupling orientation is achieved when first member represented by T-bar 118 is coupled to second member represented by yoke 130. More precisely, bearing top and bottom surfaces 118A, 118B of T-bar 118 and prongs 132B, 132A of yoke 130 are coupled, respectively. Note that without a compliance mechanism it is possible that the bearing surfaces 118A, 118B of T-bar 118 could couple to respective prongs 132B, 132A separately for one half of each rotation cycle. This can further exacerbate the adverse effects mentioned above and may indicate the need for deployment of a compliance mechanism in accordance with the invention.

FIG. 2E shows the result of application of a delivered torque $\tau_D$ provided by motor 114 about drive axis 112 via T-bar 118 to yoke 130 while in the coupled state. In this drawing, T-bar 118 and yoke 130 have already rotated by about 120° counter-clockwise from their coupled state shown in FIG. 2D.

In response to delivered torque $\tau_D$, top surface 118A applies a normal force to prong 132B and bottom surface 118B applies a normal force to prong 132A. Consequently, prongs 132A, 132B of yoke 130 generate normal reaction forces $F_{RA}$ and $F_{RB}$ as shown. Given the geometry of yoke 130 and the location of driven axis 126, these forces represent opposing torque $\tau_O$ of driven coupler 120 (see FIG. 1B). By rotating against reaction forces $F_{BA}$, $F_{RB}$ or opposing torque $\tau_O$, T-bar 118 thus transfers its delivered torque $\tau_D$ originally generated about drive axis 112, to yoke 130 rotating about driven axis 126. When axial misalignment between axes 112, 126 is small and both are well aligned with the Y-axis, once can consider the torque transfer to be about the Y-axis for all practical purposes.

In general, torque transfer in the coupled state shown in FIG. 2E is maintained for as long as driven coupler 120 on the side of stationary machine 104 needs the torque to perform any function (see FIG. 1B). The function may be mechanical or not. For example, the rotation of shaft 124 of stationary machine 104 can be used to move mechanical elements or even generate electrical power. Depending on the application, a person skilled in the art will be familiar with requisite angular velocities and other parameters.

FIG. 2F illustrates the first step of disengagement performed once torque transfer is complete. At that point, yoke 130 is preferably left in an orientation where its prongs 132A, 132B are once again aligned along the Z-axis. This is the idle or pass-through orientation for yoke 130 already defined above. It should be noted, however, that in some embodiments it is not necessary to return yoke 130 to its idle orientation. In other words, yoke 130 can be left in an arbitrary orientation.

In the present embodiment, once yoke 130 is put in the idle orientation, T-bar 118 is rotated clockwise, as indicated by arrows D. Clockwise rotation continues until T-bar 118 reaches a horizontal orientation (along the X-axis) representing the idle or pass-through orientation defined previously for T-bar 118. In the horizontal orientation, T-bar 118 can be fully disengaged.

FIG. 2G illustrates this step of completing the disengagement. It is achieved by continued motion of T-bar 118 along the engagement direction 128. Full disengagement is achieved when arbitrary rotation of T-bar 118 can no longer result in any contact with yoke 130. At this point T-bar 118 can be moved further along engagement direction 128 to engage with another yoke 130', as shown in dashed lines. Once engagement is ascertained based on achievement of first-order coaxial alignment between drive axis 112 and driven axis 126' the above-described steps can be repeated to transfer torque to yoke 130' belonging to a different stationary machine (not shown).

In practice, axial misalignment can be due to more factors than just the offset between drive and driven axes 112, 126 as illustrated in the plan views of FIGS. 2A-G. Rather, besides being offset from each other, drive and driven axes 112, 126 will sometimes not be well aligned with the Y-axis. In other words, in the general case axial misalignment is due to offsets and angular alignment differences between drive and driven axes 112, 126.

FIG. 3 presents in perspective view an apparatus 200 that is subject to axial misalignment due to both offsets and angular alignment differences. For convenience, parts corresponding to like parts that have already been described above are designated by the same reference numbers.

Apparatus 200 has a first unit 202 that is represented by a mobile robot. Mobile robot 202 is configured to be displaced along a rail 206 that is oriented generally parallel to the X-axis of coordinate system 106, which is defined as in the previous embodiment. A lateral displacement arrangement 208 consisting of compound elements 208A, 208B is provided for propelling mobile robot 202 along rail 206. In the present case, elements 208A include side mounting provisions and displacement means, e.g., wheels and motor or engine (not explicitly shown). Elements 208B include front mounted guide elements, e.g., rollers or other traction elements, and potentially another motor or engine (not explicitly shown). Of course, displacement arrangement 208 can include any suitable means known to those in the art to provide for propulsion of mobile robot 202 along rail 206.

A second unit 204 embodied by a fixed or stationary docking station, is mounted next to rail 206. Of course, many docking stations similar to docking station 204 can be positioned along rail 206. Docking station 204 contains inside its protective housing 210 a mechanism (not shown) that requires periodic delivery of torque. Due to cost and complexity considerations, station 204 cannot be equipped with its own means for generating torque.

Rail 206 is provided with a marking or alignment datum 212 on rail 206 next to docking station 204. Alignment datum 212 is used by lateral displacement arrangement 208 to determine when mobile robot 202 has reached docking station 204. In addition, in a preferred version of the present embodiment, alignment datum 212 is used to indicate the position of robot 202 on rail 206 in which first-order coaxial alignment is achieved. Of course, additional sensors such as the linear position sensor taught above or indeed any other means of determining location of robot 202 with respect to docking station 204 can be deployed. In a robust system, these sensors are used in addition to alignment datum 212 to reduce possibility of error and misalignment.

Mobile robot 202 is designed to deploy drive coupler 108 described above. Drive coupler 108 uses previously introduced parts, namely T-bar 118 mounted on drive shaft 116 and driven by motor 114 to rotate about drive axis 112. Motor 114 is not visible in FIG. 3 because it is located inside a protective housing 214 of mobile robot 202. FIG. 3, however, shows a center C of motor 114 that is on drive axis 112. Further, body coordinates $(X_b, Y_b, Z_b)$ of motor 114 are also shown. Their origin is at center C and the body $Y_b$-axis is set collinear with drive axis 112.

Docking station 204 deploys driven coupler 120 described above. Once again, driven coupler has the same parts as in the previous embodiment, namely driven shaft 124 oriented along driven axis 126 and yoke 130 with prongs 132A, 132B. The latter are for coupling with T-bar 118, which is displaced along engagement direction 128 (parallel with the X-axis) in the manner described above.

FIG. 3 introduces several virtual elements for better visualization of the main sources of axial misalignment between drive and driven axes 112, 126. First, FIG. 3 shows a virtual plane of engagement 216 that contains vector 128 defining the direction of engagement. In principle, since the direction of engagement as indicated here by vector 128 should be orthogonal to driven axis 126, vector 128 can approach driven axis 126 from any direction in virtual plane of engagement 216. In practice, of course, plane 216 is an idealization that is used here as an aid. Furthermore, note that in the present embodiment drive axis 112 is also orthogonal to virtual plane 216.

Next, FIG. 3 shows virtual cones 218, 220 that define the possible angular alignment deviations of drive and driven axes 112, 126 from their prescribed directions, namely parallel with the Y-axis. Specifically, the cone angles of virtual cones 218, 220 define the largest admissible angular deviations of axes 112, 126 respectively.

During operation, mobile robot 202 is displaced along rail 206 by lateral displacement arrangement 208. Under such propulsion, robot 202 approaches docking station 204 along rail 206. At the same time, T-bar 118, while oriented horizontally or parallel to the X-axis, moves in virtual plane 216 along engagement direction 128. It thus approaches yoke 130 of driven coupler 120 mounted in docking station 204.

Robot 202 is stopped once T-bar 118 has reached its engagement position with yoke 130. The engagement position is determined from alignment datum 212 and can be further corroborated with any additional sensors, as indicated above. Notice that yoke 130 is in the idle or pass-through orientation (with prongs 132A, 132B aligned along the Z-axis) which is the preferred orientation prior to engagement with T-bar 118. As in the previous embodiment, in the engagement position a first-order coaxial alignment between drive and driven axes 112, 126 is below a certain tolerance δ.

The first source of axial misalignment in the present embodiment is due to an offset between axes 112, 126. This offset can be measured directly in virtual plane 216, since it is just the distance between points where axes 112, 126 intersect virtual plane 216. In fact, the offset is similar to the offset discussed in the previous embodiment and reviewed in detail with reference to FIGS. 2A-G. It can be caused by any number of factors, including build tolerances of entire apparatus 200, wear of wheels belonging to displacement arrangement 208, installation tolerances of rail 206 and other parts of apparatus 200 and other well-understood mechanical factors.

The second source of axial misalignment in the present embodiment is due to angular alignment differences between axes 112, 126. Differently put, both axes 112, 126 can independently veer off from their intended parallel alignment with the Y-axis of coordinate system 106. Therefore, drive axis 112 is oriented at some unknown angle within virtual cone 218. Likewise, driven axis 126 is also oriented at some unknown angle within virtual cone 220.

When both main sources of axial misalignment (i.e., offset and angular alignment differences) are combined, the resulting first-order coaxial alignment between drive and driven axes 112, 126 can fall within a rather large tolerance. This is better seen in the partial isometric view of FIG. 4, which illustrates a portion of robot 202 and docking station 204 when T-bar 118 and yoke 130 are in the engagement position. In fact, in this drawing figure, motor 114 is also visible as a substantial portion of protective housing 214 is cut away.

Clearly, drive axis 112 extending along the body $Y_b$-axis and driven axis 126 extending along driven shaft 124 are quite misaligned. It is also apparent, that a displacement or a rotation of either T-bar 118 or yoke 130 will be insufficient to adapt to the first-order coaxial alignment between axes 112, 126 in this situation. Some combination of both rotation and translation will be required to adapt to the axial misalignment. Thus, in preferred embodiments of the invention, one or more compliance mechanisms are provided for adapting to the first-order coaxial alignment, i.e., the level of axial misalignment or the lack of high-precision axial alignment between drive and driven axes 112, 126. Such compliance is especially important during the time when torque is being transferred.

In the present case, a compliance mechanism 222 is mounted in the first unit that is embodied by mobile robot 202. Compliance mechanism 222 is a drive-side mechanism for adapting to the axial misalignment between axes 112, 126. Compliance mechanism 222 is embodied by four flexible mounting elements 224 that attach motor 114 to protective housing 214 of mobile robot 202. Compliance mechanism 222 also includes a mounting element or stage 226 that supports motor 114 on the floor of housing 214.

Elements 224, 226 of compliance mechanism 222 support a wide range of motion of motor 114. In particular, elements 224, 226 support translational and certain rotational motion of motor 114 within housing 214. In the present embodiment mounting elements 224 are embodied by springs and mounting element 226 is a bed or stage that is preferably supported on a number of pistons or dampers. Other suitable mounting elements include flexible grommets, linear slides and the like. Indeed, a person skilled in the art will recognize that any mounting provisions that permit motor 114 to be translated and rotated, preferably in five degrees of freedom, are suitable.

FIG. 5 is a partial isometric view illustrating in more detail the action of springs 224 and stage 226 that together constitute compliance mechanism 222. Specifically, FIG. 5 depicts motor 114 in its original pose (position and orientation) when springs 224 and stage 226 are in their equilibrium state. This condition holds prior to engagement and rotation of T-bar 118 about rotation axis 112 to couple with yoke 130. Instead of showing T-bar 118 and yoke 130, however, FIG. 5 indicates the drive and driven axes 112, 126 along which T-bar 118 and yoke 130 are oriented prior to coupling.

In order to better visualize the action of compliance mechanism 222, the axial misalignment between drive and driven axes 112, 126 in engagement plane 216 is greatly exaggerated. The translation or offset between axes 112, 126 is indicated by $\epsilon$, as before. On the other hand, angular deviation between axes 112, 126 is indicated by angular alignment difference $\alpha$. Jointly, offset $\epsilon$ and angular alignment difference $\alpha$ define the first-order coaxial alignment (or axial misalignment). Note, however, that the first-order coaxial alignment needs to be less than tolerance $\delta$, which is defined as offset $\epsilon$ and angular alignment difference $\alpha$ in this case.

Because of compliance mechanism 222, as T-bar 118 is rotated and couples with yoke 130 (see also FIGS. 2B-D) motor 114 can adapt to first-order coaxial alignment between axes 112, 126 defined by offset $\epsilon$ and misalignment angle $\alpha$. In the preferred embodiment, springs 224 and stage 226 afford motor 114 the ability to move in five degrees of freedom. These include the three translational degrees of freedom and two of the three rotational degrees of freedom available to rigid bodies.

More precisely, springs 224 and stage 226 allow motor 114 to translate along all three axes (X,Y,Z) of coordinate system 106. The actual amount of translation is described by three-dimensional vector d, which indicates the translation of motor 114. Once again, note that FIG. 5 greatly exaggerates the amount of translation and rotation of motor 114 along with its drive axis 112.

Springs 224 and stage 226 also permit motor 114 to rotate, but only around two axes. To better understand the constraint on rotation of motor 114, we briefly review rigid body rotations, which are traditionally described by three Euler angles $(\varphi,\theta,\psi)$. Specifically, Euler angles $(\varphi,\theta,\psi)$ describe how body axes $(X_b,Y_b,Z_b)$ originally aligned with the axes (X,Y,Z) of coordinate system 106 transform after three rotations are applied in a pre-established order. FIG. 5 depicts the full set of rotations in traditional order, namely: $\varphi$, $\theta$ and then $\psi$. The rotation angles are defined clockwise (rather than counter-clockwise as is more common) for reasons of visualization. The magnitudes of Euler angles $(\varphi,\theta,\psi)$ define rotation of body axes $(X_b,Y_b,Z_b)$ in the above-defined order. A skilled artisan will be well versed in rotation conventions and alternative descriptions thereof.

Angular alignment of axes 112, 126 requires only two rotations. Depending on the convention, these can be two of three Euler rotations or rotations by the polar and azimuthal angles. Specifically, with two rotations drive axis 112, which is fixed in body coordinates of motor 114 and collinear with body axis $Y_b$, can be brought into alignment with driven axis 126. This is seen by examining the rotation of body axis $Y_b$ by first two Euler angles $(\varphi,\theta)$ as shown in FIG. 5. Rotation of body axis $Y_b$ by first Euler angle $\varphi$ to once-rotated body axis $Y'_b$ leaves its orientation unchanged while axes $X_b$ and $Z_b$ are rotated by first Euler angle $\varphi$. Next rotation of once-rotated body axis $Y'_b$ by angle $\theta$ to twice-rotated body axis $Y''_b$ accomplishes the desired alignment. (In accordance with convention, the primes are used to indicate the number of rotations performed.) Thus, after rotations by rotation angles $(\varphi,\theta)$ drive axis 112 is in the twice-rotated state denoted by 112" and is aligned with driven axis 126.

Thus, translation by vector d and rotation by Euler angles $(\varphi,\theta)$ permit the adaptation of the drive-side to the first-order coaxial alignment. Any rotations of motor 114 beyond those required for adapting to angular alignment difference $\alpha$, should not be permitted by compliance mechanism 222. In particular, no rotation of motor about drive axis 112" should be permitted, since this is the axis about which torque is to be transmitted. The combination of springs 224 and stage 226 should be designed to accomplish this objective. If required, stage 226 may include an optional locking mechanism on its piston elements to prevent any additional rotations and/or translations after adaptation to first-order coaxial alignment due to offset $\epsilon$ and angular alignment difference $\alpha$.

It should also be stressed that in the present embodiment, driven axis 126 stays rigid during the entire adaptation process. In other words, as T-bar 118 is rotating about drive axis 112 and interacting with yoke 130, and while compliance mechanism 222 responds on the drive side by allowing motor 114 to be displaced by vector d and rotated by rotation angles $(\varphi,\theta)$, driven axis 126 stays fixed. Differently put, no mechanical compliance is provided on the side of driven coupler 120 (see FIG. 3) or the driven side in the present embodiment. Of course, in other embodiments compliance can be deployed on both drive and driven sides or on driven side only.

The adaptation to first-order coaxial alignment or the axial misalignment completes the coupling process between T-bar 118 and yoke 130 is complete. In other words, drive axis 112 is located and orientated as indicated by 112" before the transfer of torque commences. The remainder of the operation including torque transfer and disengagement proceeds as previously described.

FIG. 6 is a partial isometric view of drive coupler 108 and driven coupler 120 in the coupled state. This drawing figure illustrates another compliance mechanism 300 on the drive side for adapting to imperfect first-order coaxial alignment between drive and driven axes 112, 126. More precisely, compliance mechanism 300 is embodied here by a flexible shaft element incorporated directly into drive shaft 116.

Preferably, the material of flexible shaft element 300 is selected to exhibit a high degree of flexural deformation but a low degree of torsional deformation. Thus, element 300 should support some adaptation to offset $\epsilon$ and limited adaptation to angular alignment difference $\alpha$ (i.e., some compliance to rotation by rotation angles $(\varphi,\theta)$. Element 300 should however be entirely non-deformable under torsion about drive axis 112 in order to support efficient torque transfer.

Given these requirements, a person skilled in the art will realize that exemplary materials suitable for deployment as the compliant element 300 include a flexible shaft, universal joints, or helical coupling. In addition, a skilled artisan will recognize that it is even possible to replace entire drive shaft 116 by a single flexible drive shaft made of steel (e.g., braided steel). The flexible shaft can be mated to rigid elements by crimping, soldering or welding. Furthermore, although compliance mechanism 300 can be used by itself, as illustrated in FIG. 6, it can also be used in combination with compliance mechanism 222, or indeed in combination with other compliance mechanisms described further below.

FIGS. 7A-C are partial isometric views of alternative drive-side compliance mechanisms deployed on drive shaft 116. FIG. 7A depicts shaft 116 equipped with a compliant linkage 302. In some applications a single linkage 302 may be sufficient to adapt to first-order coaxial alignment. In other applications, two or even more linkages may need to be used.

FIG. 7B illustrates the use of a helical coupling 304 as the driver-side compliance mechanism on drive shaft 116. As will be appreciated by those skilled in the art, the length of helical coupling 304 should be chosen based on tolerance δ.

FIG. 7C shows the use of a universal joint 306 to adapt to axial misalignment. Again, depending on tolerance δ, two or more universal joints may be required on drive shaft 116 to adapt to first-order coaxial alignment. Of course, in any of these embodiments other elements such as gimbals or magnetic couplings can be used as alternative or additional compliance mechanisms. Persons skilled in the art will recognize that they would be incorporated into drive shaft 116 in the same manner as the compliance mechanisms already shown.

In combination or separately from the one or more compliance mechanisms operating on the drive side, one or more compliance mechanisms can be mounted within the second unit or on the driven side. The driven side compliance mechanisms can include analogous mechanisms to those used on the drive side for adapting to the imperfect first-order coaxial alignment.

FIG. 7D is a partial isometric view of a driven-side compliance mechanism embodied by driven shaft 124 oriented along driven axis 126 and incorporating a compliant linkage 308. However, it will be understood by those skilled in the art, that alternatives such as flexible shafts or shaft portions, helical couplings, universal joints, gimbals, magnetic couplings and the like can be used in driven shaft 124. In fact, the shafts on the drive side and on the driven side can deploy any compliance mechanism from the same group of elements already listed or from any group of analogous elements.

The compliance mechanism itself can take on many physical embodiments and it can be mounted in various locations. For example, it can be embodied by spring-mounted suspensions and other compliance mechanisms attached to driven-side elements that are not explicitly shown in the present embodiments. As in the case of suspension of drive-side elements such as the motor, any spring-mounted suspensions on the driven side should allow for translational motion but be relatively rigid in compliance to rotations. This is especially true for rotations about the driven axis. Such choices are made in order to support efficient torque transfer.

There are many advantageous steps and mechanical adaptations that can be provided in any of the basic embodiments of the invention taught above. These steps and mechanisms generally fall into three groups. The first group includes collision avoidance and mitigation. The second group includes advantageous engagement and coupling of first and second mating members belonging to the drive and driven couplers, respectively. The third group, which is related to the second group, includes the use of features on the first and second mating members for improving the first-order coaxial alignment to a second-order coaxial alignment that is closer to ideal coaxial alignment. A person skilled in the art will recognize that these additional steps and adaptations can be used in various combinations as most of them are not mutually exclusive.

FIG. 8A illustrates in a side plan view a method of collision avoidance. The method can be deployed in any of the above-described embodiments. Here, the method for collision avoidance is illustrated with T-bar 118 and yoke 130 already described above.

T-bar 118 is shown moving along engagement direction 128. Yoke 130, meanwhile, is not in the preferred idle or pass-through orientation as shown, for example, in FIG. 2A. Advantageously, however, yoke 130 is still outside a range of orientations designated by a keep-out angle β, in which a collision between T-bar 118 and yoke 130 would occur.

To avoid yoke 130 from assuming an orientation within keep-out angle β, it is advantageous that T-bar 118 rotate yoke 130 and verify that it is outside keep-out angle β before completely disengaging after torque transfer. This is important because the driven coupler has no ability to rotate yoke 130 on its own. It is thus up to the drive coupler to either rotate yoke 130 into the preferred idle orientation, or, at the very least, leave yoke 130 in an orientation outside of keep-out angle β.

FIG. 8B illustrates in a side plan view another method of collision avoidance. Here, T-bar 118 is inclined with respect to engagement direction 128. Thus, as T-bar 118 approaches prong 132B of yoke 130, top surface 118A of T-bar 118 engages with prong 132B, as shown in dashed lines. T-bar 118 then receives a torque $\tau_{CA}$ from its motor and rotates counter-clockwise (not shown). In doing so, it transmits a force to yoke 130 via prong 132B. As a result, yoke 130 is pushed out of the range of orientations delimited by keep-out angle β. The corresponding rotation of yoke 130 is designated by arrow CA and the yoke's orientation after being pushed out beyond keep-out angle β is indicated in dashed lines.

Having removed yoke 130 from the range of orientations defined by keep-out angle β, T-bar 118 can be re-oriented to parallel with the X-axis. It then moves to engage, couple and transfer its regular drive torque $\tau_D$, as described above. Once it completes the transfer, T-bar 118 can either leave yoke 130 in its original pose within keep-out angle β or return it to the preferred idle or pass-though orientation to allow engagement without the described collision-avoidance process.

Figure 9A:
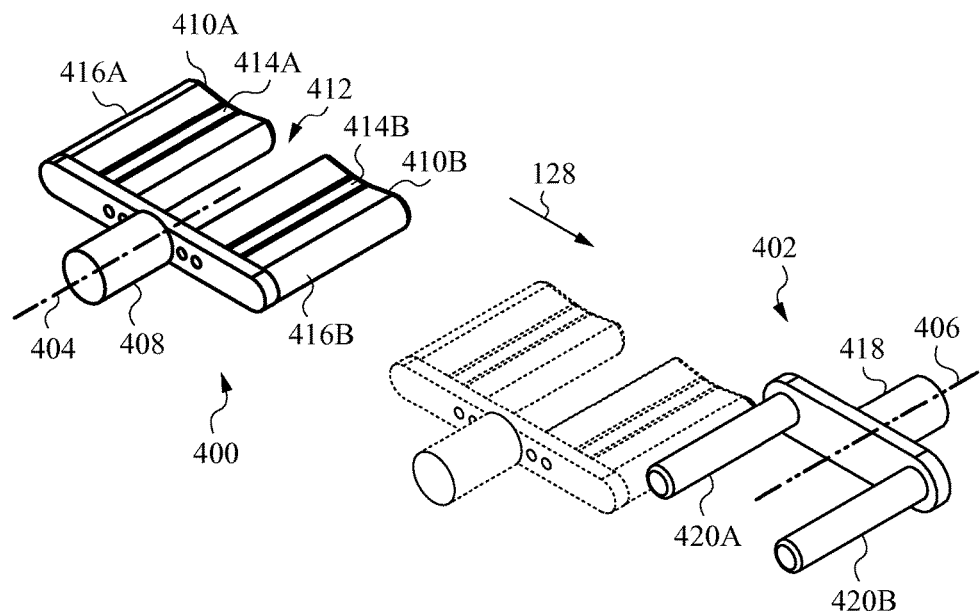
Figure 9B:
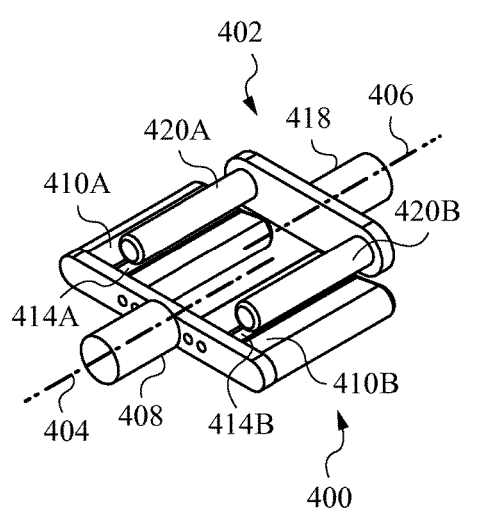
Figure 9C:
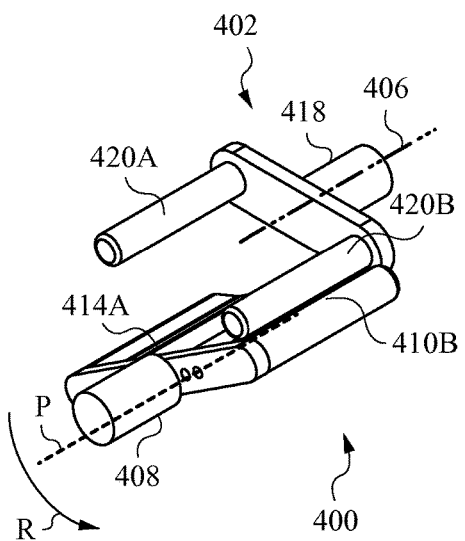

FIGS. 9A-C illustrate in isometric views an advantageous method of engagement and design of first and second mating members 400, 402 on the drive and driven couplers, respectively. Members 400, 402 are provided with certain structure to mitigate the effects of collisions and to improve coaxial alignment between drive and driven axes 404, 406.

FIG. 9A shows member 400 mounted on a drive shaft 408. Member 400 has two engagement paddles 410A, 410B as well as a center void or cutout 412. Paddles 410A, 410B have engagement features 414A, 414B on their upper surfaces, which are visible in FIG. 9A. Features 414A, 414B are indentations produced in the upper surfaces of paddles 410A, 410B. In addition, paddles 410A, 410B have collision mitigating features 416A, 416B in the form of rounded exterior edges.

Member 402 is mounted on a driven shaft 418 and has two round pins 420A, 420B serving the role of its engagement features. Pins 420A, 420B may be structurally reinforced to provide for additional collision mitigation on the driven side of the apparatus. It is noted that the construction of member 402 is related to the previously described yoke 130.

Members 400, 402 are designed to engage laterally along engagement direction 128. Member 400 is indicated in dashed lines at the initial point of contact with pin 420A of member 402. It is noted that the contact generally produces a collision. We note that the adverse effects of such collision are mitigated by the aforementioned compliance mechanism and collision mitigating features. In the present orientation of member 400, mitigating feature 416B deflects member 400 downward and under pin 420A.

It should be noted that drive shaft 408 of member 400 is preferably compliant in this embodiment to further promote downward or upward deflection of member 400. For example, drive shaft 408 can be made of a crossed steel mesh to support bending but remain rigid under the application of torsional stress and thus promote efficient torque transfer.

FIG. 9B illustrates member 400 in engagement with member 402. At this point, a first-order coaxial alignment between drive and driven axes 404, 406 is established. Notice, however, that the first-order coaxial alignment achieved in this case is not the expected or desired alignment for the drive and driven couplers as previously illustrated in FIG. 2C. Pins 420A, 420B are located on paddles 410A, 410B and they are pressed against engagement features 414A, 414B.

FIG. 9C shows member 400 commencing its counter-clockwise rotation indicated by arrow R. The rotation forces paddle 410A to disengage from pin 420A as member 400 pivots about pin 420B. The pivoting action about pin 420B is further supported by engagement feature 414B (not visible in FIG. 9C). The pivot axis P about which the pivoting takes place is indicated in a dashed line. At this point is becomes clear that the choice of a compliant drive shaft 408 is advantageous as, in addition to engagement feature 414B, it further facilitates the pivoting action.

Figure 9D:
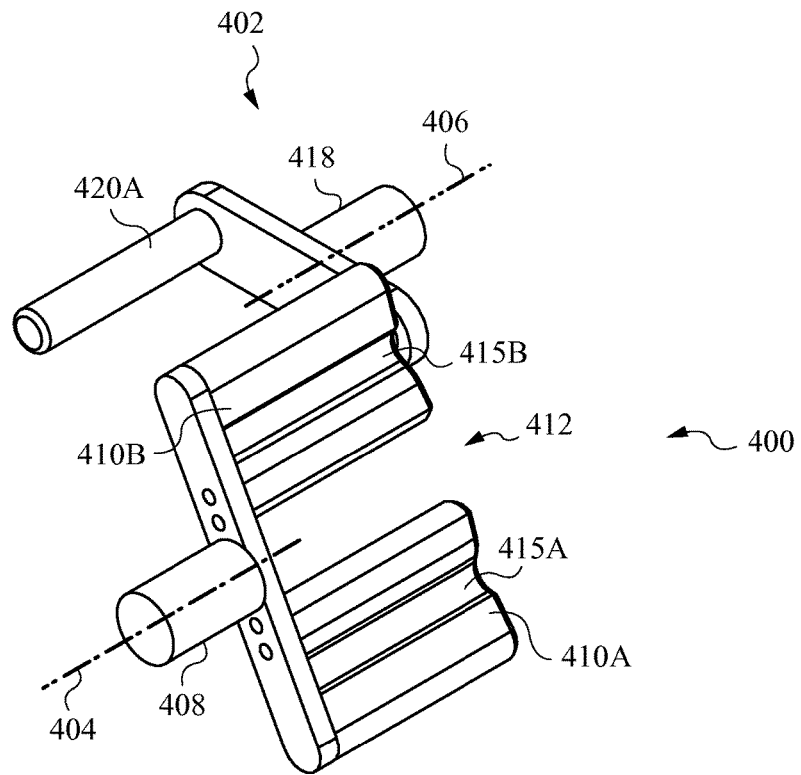

FIG. 9D illustrates rotation and loading of member 400 against pin 420B. This occurs as the force of static friction between pin 420B and feature 414B of paddle 410B is be overcome by the force built up in deflected drive shaft 408 and whatever compliance mechanisms are being deployed besides compliant drive shaft 408 (see above for other compliance mechanisms).

Figure 9E:
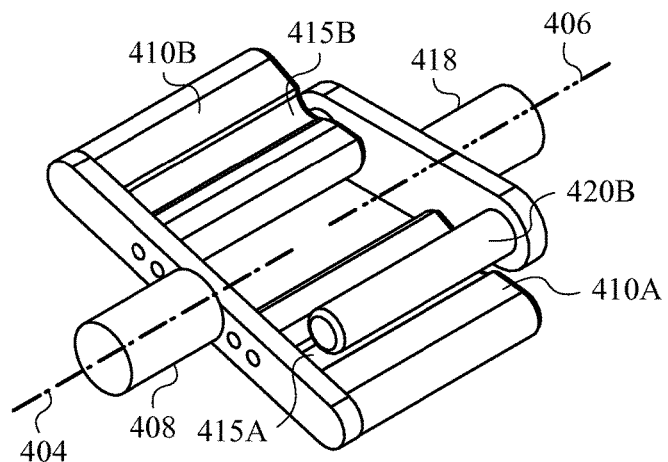

Finally, as shown in FIG. 9E, paddle 410B of member 400 slips off pin 420B. Because of the presence of cutout 412, pin 420B is able to pass through this void and member 400 is able to reach the desired engagement with member 402. Note that engagement features 414B, 415A of member 400 and engagement features 420A, 420B of member 402 also urge members 400, 402 to assume a three-dimensionally constrained relative engagement pose shown in FIG. 9E. The assumption of this pose is supported by engagement features 414A, 415B on the other sides of paddles 410A, 410B when member 400 is rotated 180 degrees from the orientation shown. Preferably, features 415A, 415B are recesses dimensioned to engage and hold pins 410A, 410B.

Another advantageous aspect of the embodiment shown in FIGS. 9A-E is that the three-dimensionally constrained relative pose thus achieved improves the axial alignment of drive and driven axes 404, 406. Specifically, by comparing the imperfect first-order coaxial alignment in FIG. 9B and second-order coaxial alignment in FIG. 9E after the "flip" maneuver preformed by member 400 (the "flip" is shown in FIGS. 9C-E) it is quite clear that the second-order coaxial alignment is almost truly coaxial.

In view of the above embodiment, it is clear why it is advantageous to provide for complementary engagement features that promote or urge the two mating members of the drive coupler and the driven coupler in a manner that leads to three-dimensionally constrained relative engagement. Even more preferable are complementary engagement features that lead to constrained engagement and also reduce misalignment to a more accurate second-order coaxial alignment. The latter is even more important in embodiments where first-order coaxial alignment is expected to be poor or may frequently exceed the desired tolerance $\delta$.

As already indicated, appropriate engagement features can be embodied by recesses, slots, ridges and the like. These can be provided on the first mating member, the second mating member or both. In fact, there are also several advantageous geometries of complementary engagement features to promote accurate second-order coaxial alignment as well as provide for well-constrained engagement that is relatively immune to external forces.

FIGS. 10A-B illustrate the principle behind such advantageous designs of complementary engagement features based on a dog clutch 500. FIG. 10A is an isometric view of dog clutch 500 and its two mating members 502, 504. Mating member 502 has three coupling features 506A, 506B, 506C. Member 504 also has three coupling features 508A, 508B, 508C. Member 502 is the drive member and thus engages coupling features 508A, 508B, 508C with its coupling features 506A, 506B, 506C to deliver torque.

FIG. 10B is a plan view that illustrates the forces applied to coupling features 508A, 508B, 508C of member 504 by member 502 when a counter-clockwise driving torque is applied. Given that there are three engagement points and three corresponding non-parallel drive force vectors F1, F2, F3 that define the engagement torque the overall engagement is very stable.

Specifically, the engagement is stable because any external force is unable to break the engagement, unless it exceeds in magnitude the magnitude of a vector sum of the drive force vectors F1, F2, F3 that combine to directly oppose the external force. The principles behind this stability will be familiar to those skilled in the art.

Of course, dog clutch 500 in the embodiment shown is not amenable to the present invention due to the requirement for lateral engagement between the drive and driven couplers. However, the principle of using three forces F1, F2, F3 in the manner depicted in FIG. 10B is directly applicable to couplers that can be used in the apparatus and methods of the instant invention.

FIG. 11A illustrates mating members 600 and 602 in an isometric view. Members 600, 602 are provided with complementary engagement features 604, 606 and 608, 610, respectively, in order to establish the desired three points of contact and hence three drive forces F1, F2, F3. As in the prior embodiments, engagement direction is indicated by vector 128.

FIG. 11B is a plan view illustrating the engagement of members 600, 602. The pre-engagement position of member 600 is indicated in dashed lines.

FIG. 11C is another plan view showing the coupling achieved between members 600, 602 and the three drive forces F1, F2, F3 generated between them due to the complementary design of engagement features 604, 606 and 608, 610. Note that, again, drive force vectors F1, F2, F3 are non-parallel and oriented so that they can combine to resist an in-plane external force of any orientation.

FIG. 12 illustrates in isometric view another possible design of complementary engagement features in two members 700, 702. The isometric views afforded by FIGS. 13 and 14 illustrate two other advantageous designs of members 800, 802 and members 900, 902 with complementary engagement features. Note that in the last two figures the corresponding members are already properly coupled and ready for torque transmission. Also note that for these last two designs, coupling the corresponding members results in four contact forces rather than three contact forces of previous designs.

The apparatus and methods of invention admit of many alternative embodiments. For example, collision-mitigation features can be deployed on the drive and driven sides as the driven side as a function of expected velocities and dimensions of the apparatus. The apparatus can be deployed in indoor and outdoor environments. An appropriate application of the embodiment in which the mobile robot moves on a rail is in the solar industry. In such applications the robot can move between docking stations that are solar trackers 205 (see FIG. 3) and deliver torque to periodically adjust their orientation with respect to the sun.

In view of the above teaching, a person skilled in the art will recognize that the apparatus and method of invention can be embodied in many different ways in addition to those described without departing from the spirit of the invention. Therefore, the scope of the invention should be judged in view of the appended claims and their legal equivalents.

We claim:

1. An apparatus for transferring a torque between a mobile machine unit with a torque delivery drive and a stationary machine unit adapted to perform certain operations upon delivery of torque to a driven shaft thereof, the apparatus comprising:

a drive coupler for delivering the torque through rotation about a drive axis, the drive coupler being mounted on the mobile machine unit, the mobile unit having a lateral displacement mechanism for moving the mobile unit along an engagement direction substantially orthogonal to the drive axis and the torque delivery drive configured for rotating the drive coupler about the drive axis;

a driven coupler on a distal end of the driven shaft of the stationary machine unit, the driven shaft having a driven axis and being mounted on the stationary machine unit, the driven coupler being arranged for engaging with the drive coupler along an engagement direction substantially orthogonal to the driven axis from a disengaged position using only movement in the engagement direction, wherein engagement of the drive coupler and driven coupler further aligns the drive coupler and driven coupler to facilitate transmission of torque therebetween;

wherein the lateral displacement mechanism is configured for moving the drive coupler along the engagement direction to achieve a first-order coaxial alignment between the drive axis and the driven axis;

wherein the torque delivery drive is configured for rotating the drive coupler about the drive axis after the first-order coaxial alignment is achieved to engage the drive coupler with the driven coupler to achieve a second-order coaxial alignment between the drive axis and the driven axis and then transfer said torque about the driven axis;

whereby the apparatus transfers the torque from the mobile machine unit to the stationary machine unit, wherein the driven coupler comprises a pair of rounded pins spaced apart and extending parallel to the driven axis, and the drive coupler comprises a pair of engagement paddles with a center void therebetween, each of the pair of engagement paddles extending distally along the drive axis and having an indentation that extends longitudinally in parallel with the drive axis along an outer surface thereof so as to engage the pair of rounded pins of the driven coupler upon rotation of the drive coupler when co-axially aligned with the driven coupler.

2. The apparatus of claim 1, wherein the drive coupler comprises a first mating member comprising the pair of paddles and the driven coupler comprises a second mating member comprising the pair of pins, the first mating member and the second mating member having a matched geometry defining a pass-through orientation in which the pair of paddles of the first mating member passes between the spaced apart pair of pins of the second mating member without physical contact to facilitate lateral displacement of the drive coupler relative the driven coupler to achieve first order-coaxial alignment therebetween.

3. The apparatus of claim 2, wherein the matched geometry further defines a relative coupling orientation in which the first mating member couples to the second mating member such that the pair of pins are engaged within the indentations of the pair of paddles thereby facilitating transfer of torque from the torque delivery drive of the mobile machine unit to the driven shaft of the stationary machine unit.

4. The apparatus of claim 1, further comprising a compliance mechanism for adapting to the first-order coaxial alignment between the drive axis and the driven axis during coupling and transfer of torque about the driven axis.

5. The apparatus of claim 4, wherein said compliance mechanism is mounted within the mobile machine unit and comprises a drive-side mechanism configured for adapting to the orientation of the drive axis.

6. The apparatus of claim 5, wherein the drive-side mechanism configured for adapting to the orientation of the drive axis comprises at least one flexible mounting element attaching the torque delivery drive within the mobile machine unit and supporting motion of the torque delivery drive with respect to the mobile machine unit.

7. The apparatus of claim 6, wherein the flexible mounting element is selected from the group consisting of springs, dampers, pistons, flexible grommets and linear slides.

8. The apparatus of claim 5, wherein the drive-side mechanism configured for adapting to the orientation of the drive axis comprises a drive shaft oriented along the drive axis and comprising at least one compliant element.

9. The apparatus of claim 8, wherein the compliant element is selected from the group consisting of flexible shafts, compliant linkages, helical couplings, universal joints, gimbals and magnetic couplings.

10. The apparatus of claim 4, wherein the compliance mechanism is mounted within the stationary machine unit and comprises a driven-side mechanism configured for adapting to the orientation of the driven axis.

11. The apparatus of claim 10, wherein the driven side mechanism configured for adapting to the orientation of the drive axis comprises the driven shaft oriented along the driven axis and comprising at least one compliant element.

12. The apparatus of claim 11, wherein the compliant element is selected from the group consisting of flexible shafts, compliant linkages, helical couplings, universal joints, gimbals and magnetic couplings.

13. The apparatus of claim 1, wherein the drive coupler comprises a first mating member that comprises the pair of paddles and the driven coupler comprises a second mating member comprising the pair of pins.

14. The apparatus of claim 13, wherein the pair of pins and the indentations of the pair of paddles are arranged for urging the first mating member and the second mating member to assume a three-dimensionally constrained relative engagement pose in which the first-order coaxial alignment is adjusted to the second order coaxial alignment when the pair of pins are engaged within the indentations of the pair of paddles and the drive coupler is rotated.

15. The apparatus of claim 13, wherein the pair of pins and the indentations of the pair of paddles are arranged for urging the drive coupler to assume a three-dimensionally constrained relative engagement pose when the first-order coaxial alignment exceeds a predetermined tolerance.

16. The apparatus of claim 1, wherein the drive coupler further comprises at least one collision-mitigating feature for mitigating the impact of collision with the driven coupler.

17. The apparatus of claim 1, wherein the driven coupler further comprises at least one collision-mitigating feature for mitigating the impact of collision with the drive coupler, wherein the collision-mitigating feature comprises rounded exterior edges of the pair of paddles.

18. The apparatus of claim 1, further comprising a rail for mounting the mobile machine unit such that the mobile machine unit moves along the rail.

19. The apparatus of claim 1, wherein the stationary machine unit is a solar tracker.

20. An apparatus for transferring a torque between a mobile machine unit with a torque delivery drive and a stationary machine unit adapted to perform certain operations upon delivery of torque to a driven shaft thereof, the apparatus comprising:

a drive coupler for delivering the torque through rotation about a drive axis, the drive coupler being mounted on the mobile machine unit, the mobile unit having a lateral displacement mechanism for moving the mobile unit along an engagement direction substantially orthogonal to the drive axis and the torque delivery drive configured for rotating the drive coupler about the drive axis;

a driven coupler on a distal end of the driven shaft of the stationary machine unit, the driven shaft having a driven axis and being mounted on the stationary machine unit, the driven coupler being arranged for engaging with the drive coupler along an engagement direction substantially orthogonal to the driven axis from a disengaged position using only movement in the engagement direction, wherein engagement of the drive coupler and driven coupler further aligns the drive coupler and driven coupler to facilitate transmission of torque therebetween;

wherein the lateral displacement mechanism is configured for moving the drive coupler along the engagement direction to achieve a first-order coaxial alignment between the drive axis and the driven axis;

wherein the torque delivery drive is configured for rotating the drive coupler about the drive axis after the first-order coaxial alignment is achieved to engage the drive coupler with the driven coupler to achieve a second-order coaxial alignment between the drive axis and the driven axis and then transfer said torque about the driven axis;

whereby the apparatus transfers the torque from the mobile machine unit to the stationary machine unit, wherein the driven coupler comprises a yoke having a pair of rounded pins spaced apart and extending parallel to the driven axis, and the drive coupler comprises a pair of engagement paddles with a center void therebetween, each of the pair of engagement paddles extending distally along the drive axis and having an indentation along an upper surface thereof arranged to engage the pair of rounded pins of the driven coupler upon rotation of the drive coupler when co-axially aligned with the driven coupler.

\* \* \* \* \*